United States Patent
Kang et al.

(10) Patent No.: US 11,997,035 B2
(45) Date of Patent: May 28, 2024

(54) METHOD FOR TRANSMITTING AND RECEIVING PLURALITY OF PHYSICAL DOWNLINK CONTROL CHANNELS IN WIRELESS COMMUNICATION SYSTEM, AND DEVICE THEREFOR

(71) Applicant: LG ELECTRONICS INC., Seoul (KR)

(72) Inventors: Jiwon Kang, Seoul (KR); Hyungtae Kim, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/420,073

(22) PCT Filed: Jan. 13, 2020

(86) PCT No.: PCT/KR2020/000620
§ 371 (c)(1),
(2) Date: Jun. 30, 2021

(87) PCT Pub. No.: WO2020/145794
PCT Pub. Date: Jul. 16, 2020

(65) Prior Publication Data
US 2022/0085938 A1    Mar. 17, 2022

(30) Foreign Application Priority Data

Jan. 11, 2019    (KR) .................. 10-2019-0003760

(51) Int. Cl.
*H04L 5/00* (2006.01)
(52) U.S. Cl.
CPC ................. *H04L 5/0048* (2013.01)

(58) Field of Classification Search
CPC ... H04L 5/0048; H04L 5/0023; H04L 5/0053; H04L 1/00; H04L 5/0094; H04B 7/024; H04B 7/0408; H04B 7/06; H04W 72/04
See application file for complete search history.

(56) References Cited

U.S. PATENT DOCUMENTS

| 2015/0304997 A1 | 10/2015 | Park et al. |
| 2016/0006553 A1 | 1/2016 | Kim et al. |

(Continued)

FOREIGN PATENT DOCUMENTS

| KR | 1020140047504 | 4/2014 |
| KR | 1020180021613 | 3/2018 |

OTHER PUBLICATIONS

3GPP TS38.331 v15.4.0, NR; Radio Resource Control (RRC) protocol specification, Oct. 30, 2018, see sections 5.5.1, 5.5.3.1.

*Primary Examiner* — Sharmin Chowdhury
(74) *Attorney, Agent, or Firm* — BRYAN CAVE LEIGHTON PAISNER LLP

(57) ABSTRACT

The present specification proposes a method for transmitting and receiving a plurality of PDCCHs in a wireless communication system, and a device therefor. Specifically, a method performed by a base station comprises: a step for receiving, from a UE, UE capability information indicating the number of beams that can be simultaneously supported; a step for transmitting independent layer joint transmission (ILJT)-related setting information to the UE; and a step for transmitting the plurality of PDCCHs to the UE on the basis of the ILJT-related setting information, wherein the ILJT-related setting information may be determined on the basis of the UE capability information.

10 Claims, 19 Drawing Sheets

(56) References Cited

U.S. PATENT DOCUMENTS

| | | | | |
|---|---|---|---|---|
| 2020/0145172 A1* | 5/2020 | Zhou | .................... | H04W 80/02 |
| 2020/0154450 A1* | 5/2020 | Zhou | .................... | H04W 72/20 |
| 2020/0154467 A1* | 5/2020 | Gong | .................... | H04L 5/0092 |
| 2020/0196383 A1* | 6/2020 | Tsai | ...................... | H04L 1/1614 |
| 2020/0228970 A1* | 7/2020 | Noh | ...................... | H04W 8/245 |
| 2021/0168775 A1* | 6/2021 | Hang | .................... | H04L 5/0094 |
| 2021/0410170 A1* | 12/2021 | Matsumura | ........... | H04L 5/0048 |
| 2022/0239363 A1* | 7/2022 | Kim | ...................... | H04B 7/0619 |

* cited by examiner

【FIG. 1】
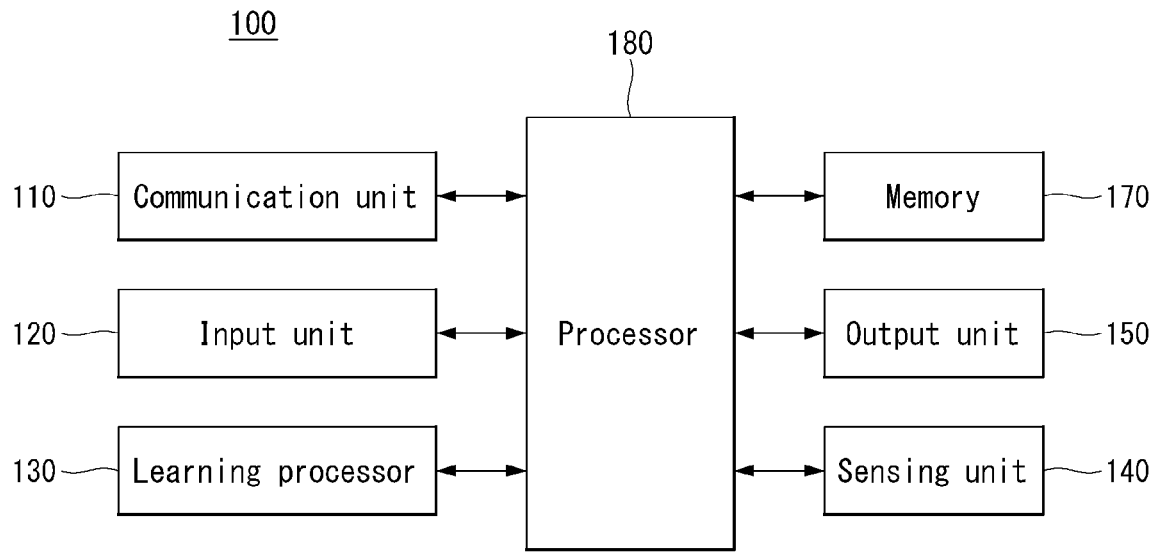
【FIG. 2】
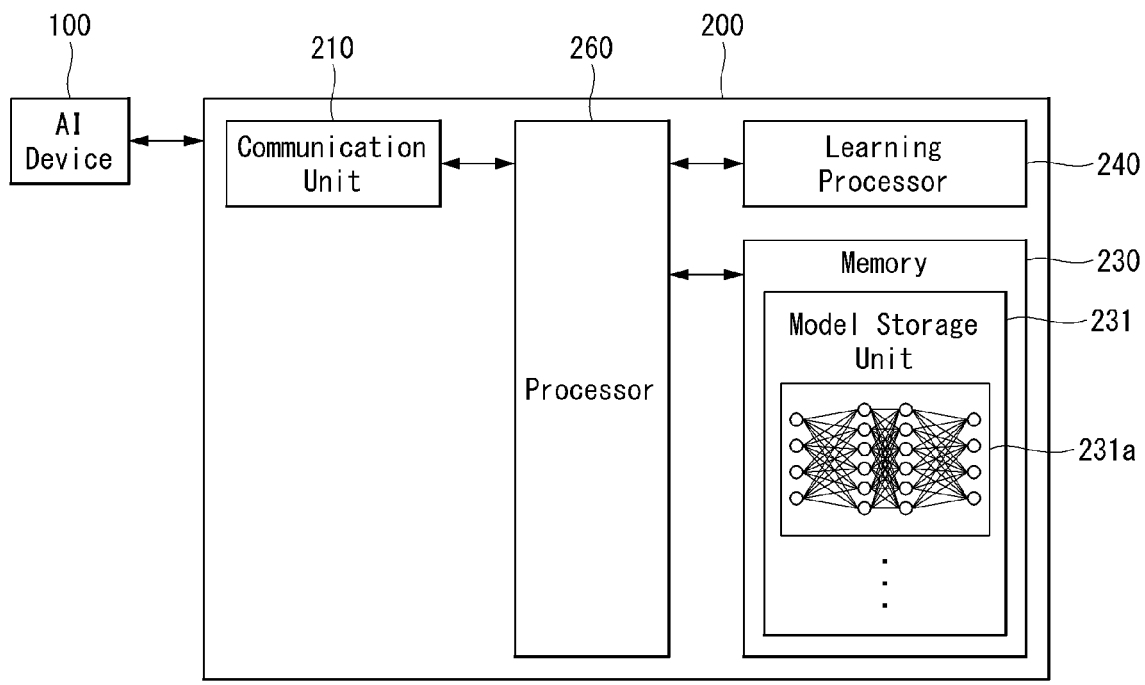

[FIG. 3]
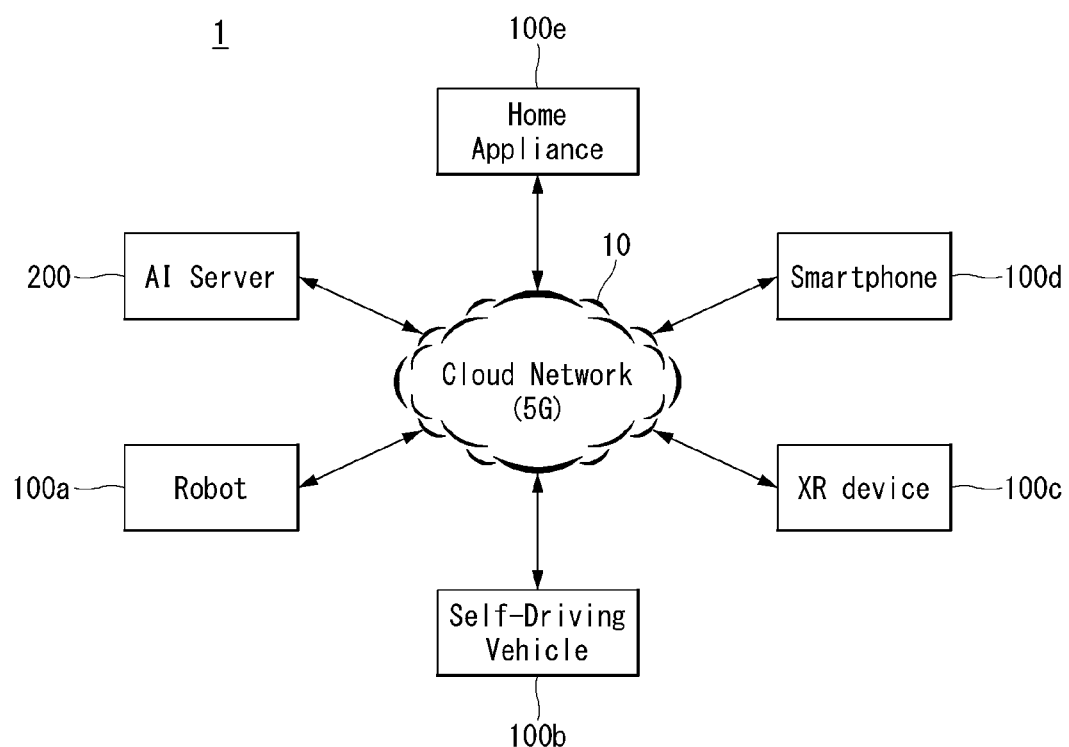

【FIG. 4】
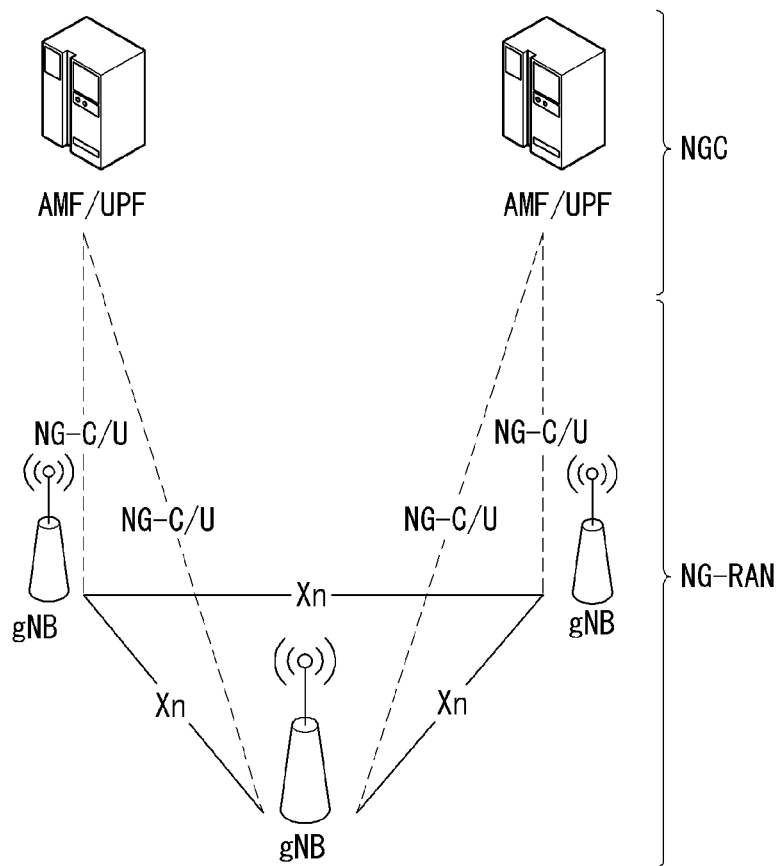
【FIG. 5】
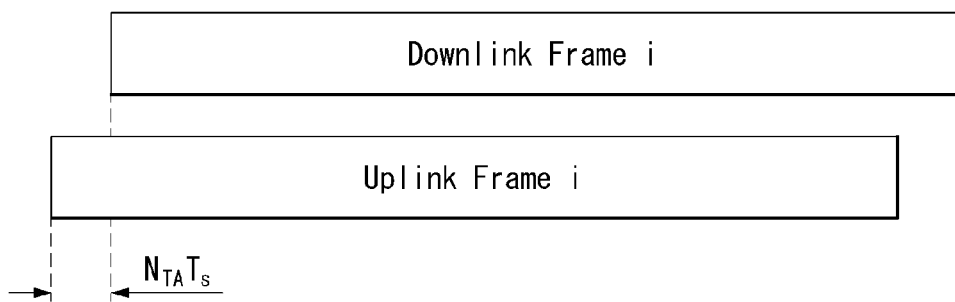

[ FIG. 6 ]
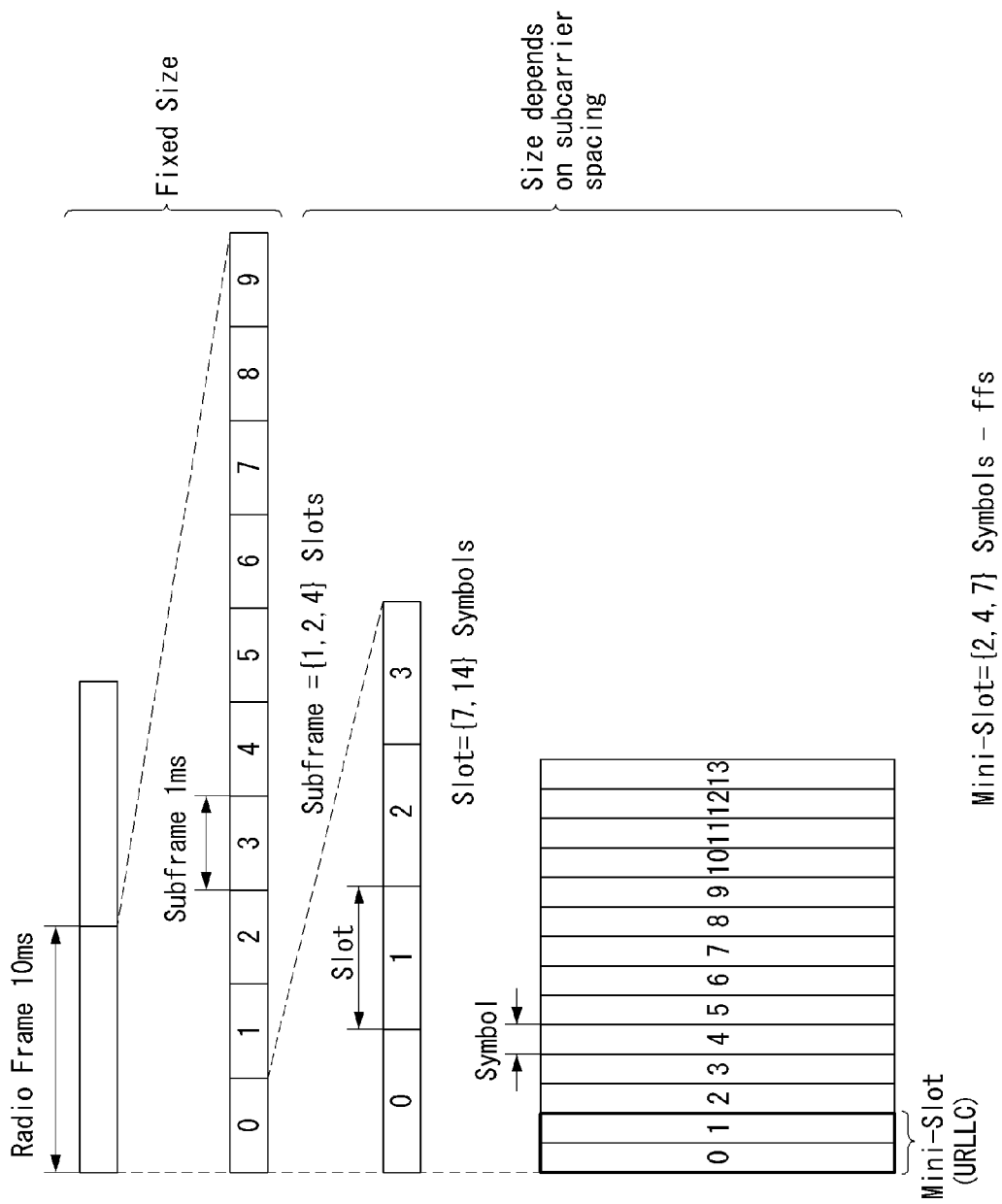

[FIG. 7]
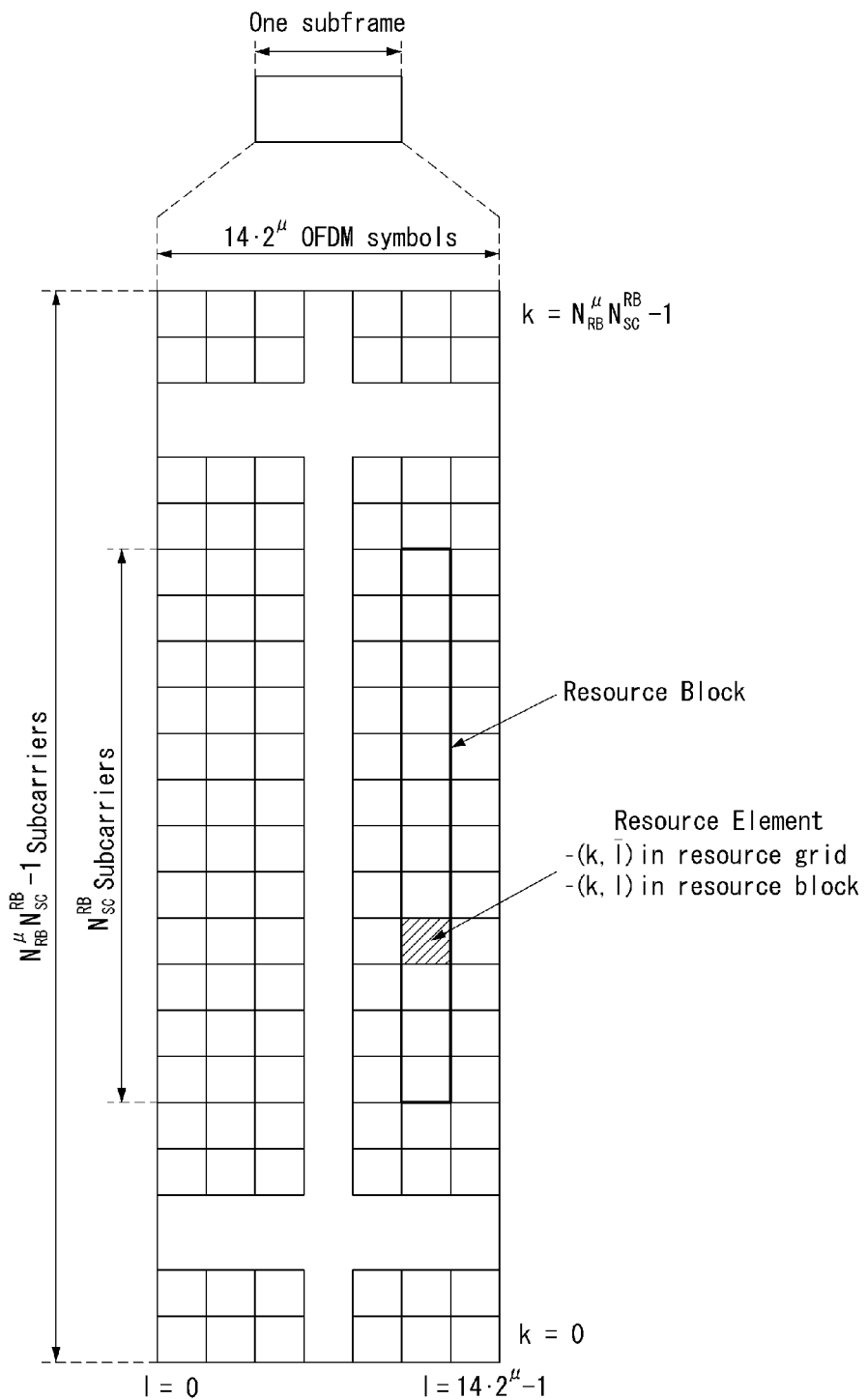

[FIG. 8]
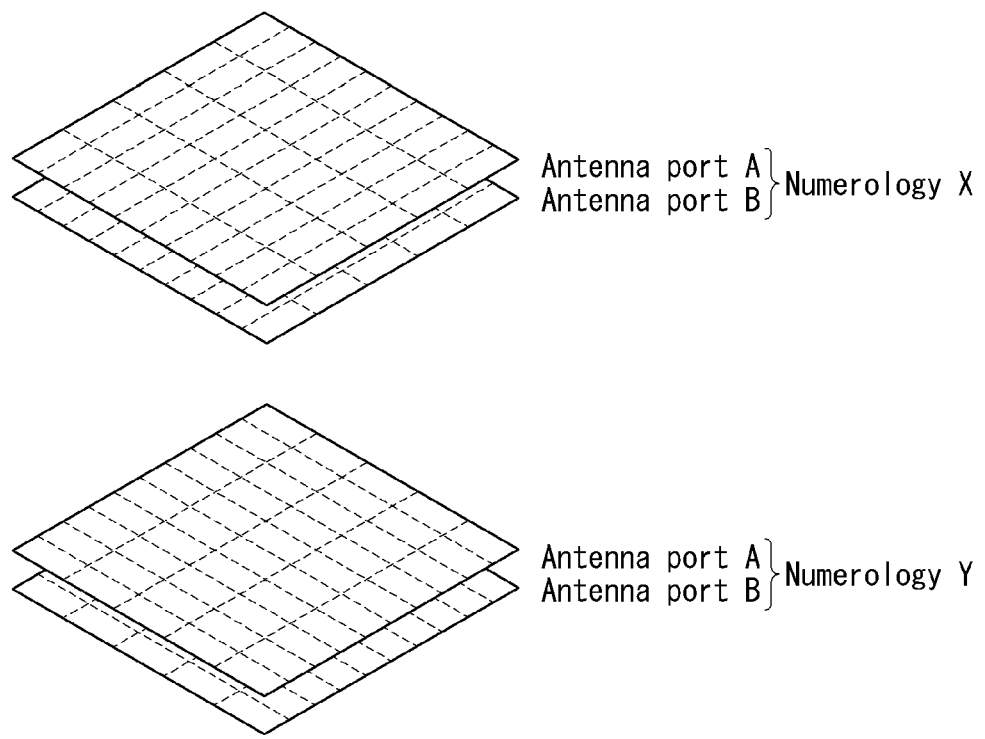

[FIG. 9]
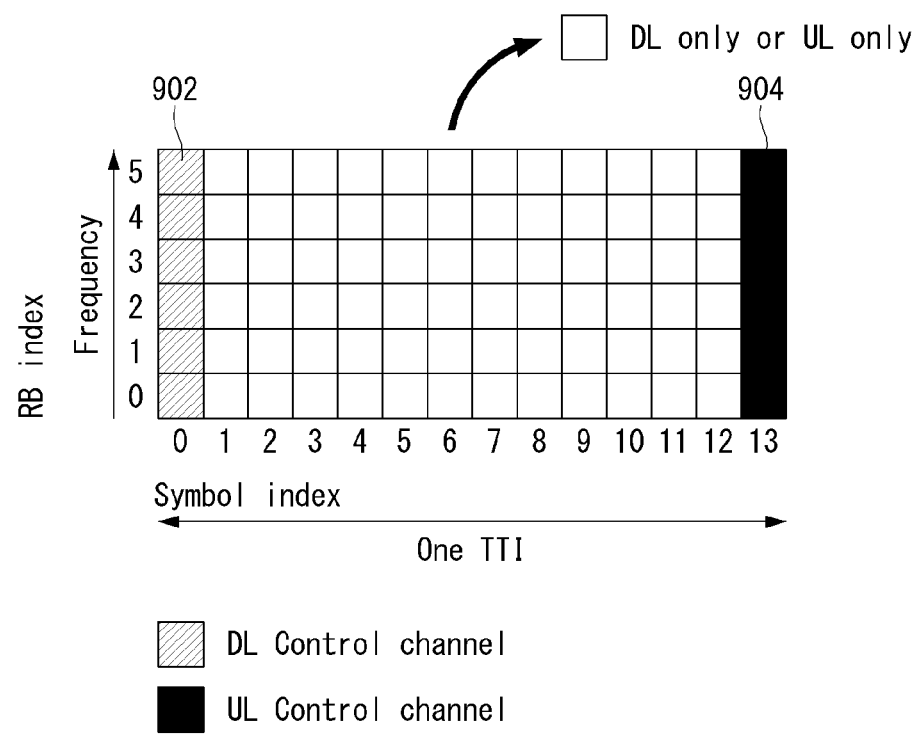

[FIG. 10]
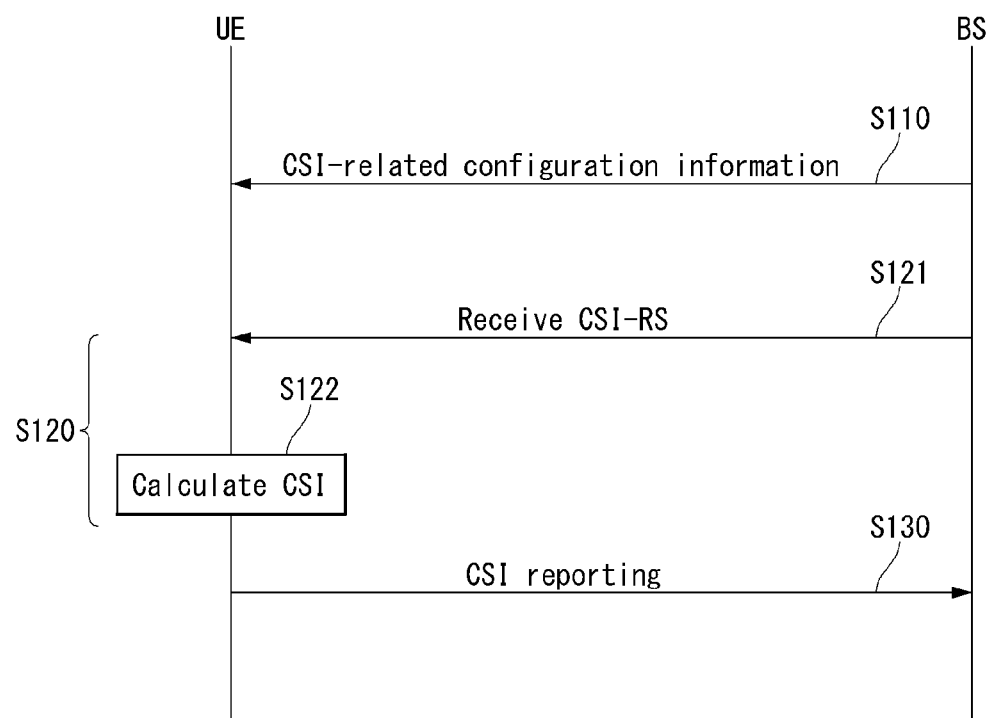

[FIG. 11]
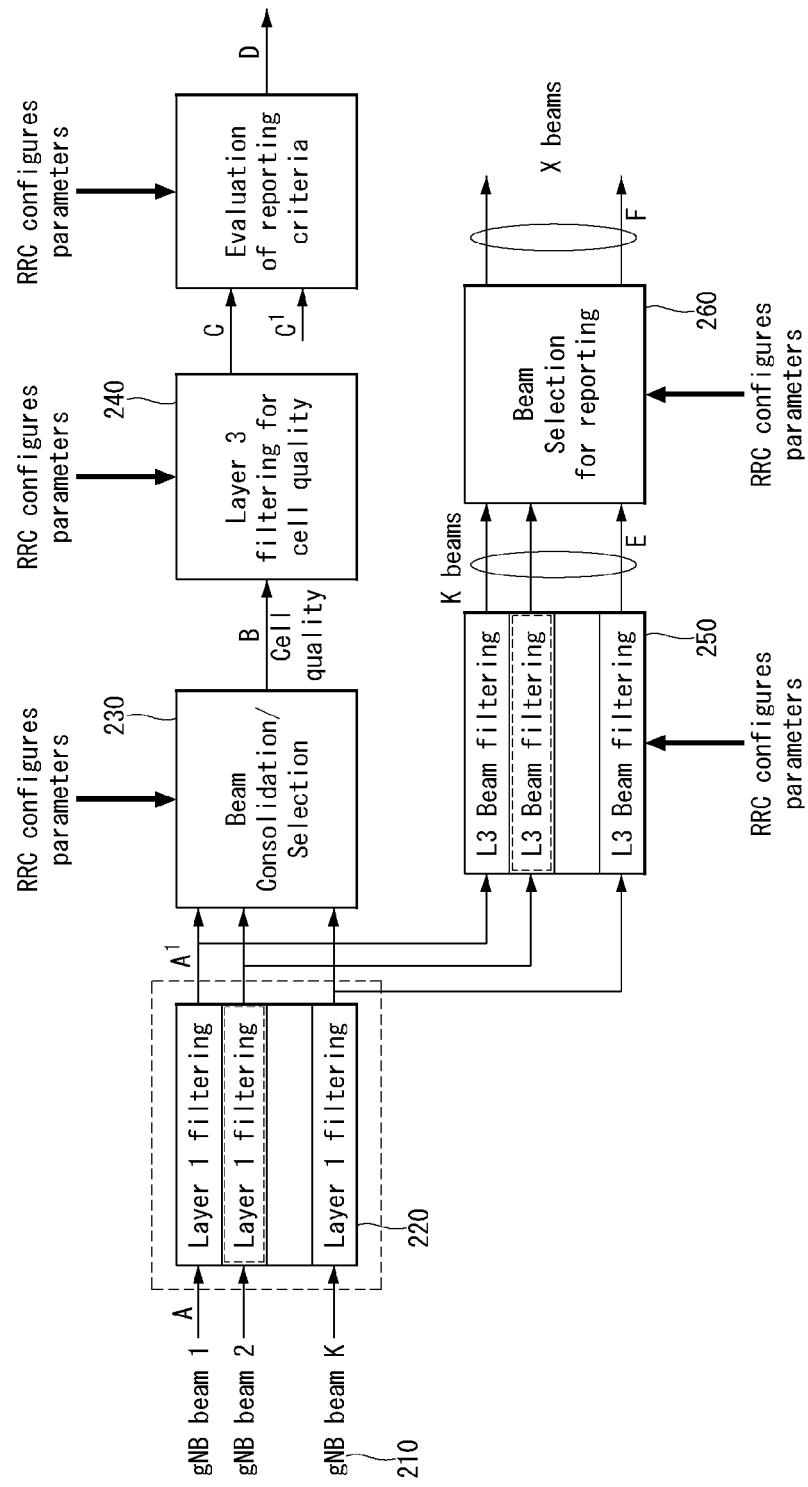

[FIG. 12]
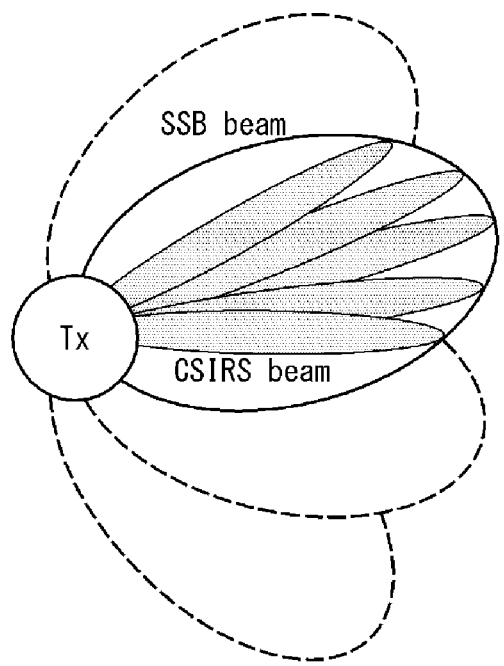
[FIG. 13]
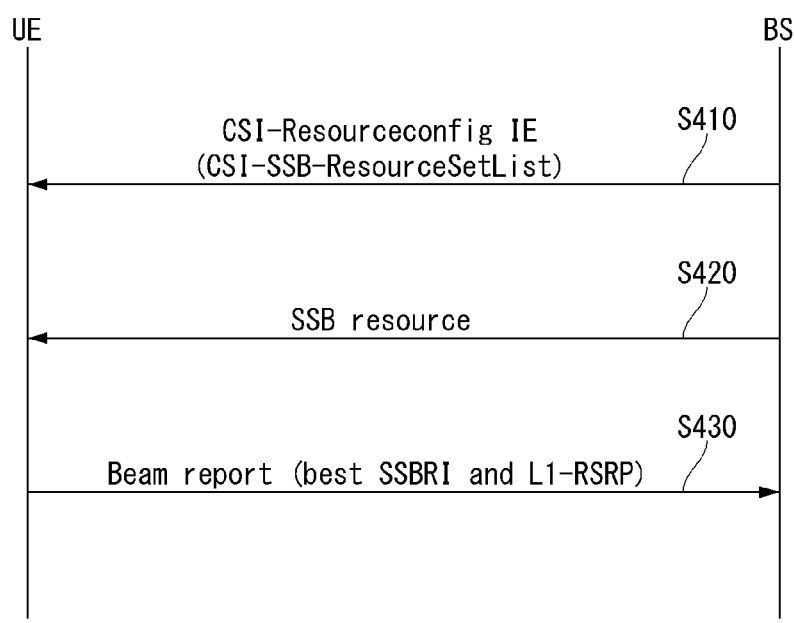

[FIG. 14]
(a)
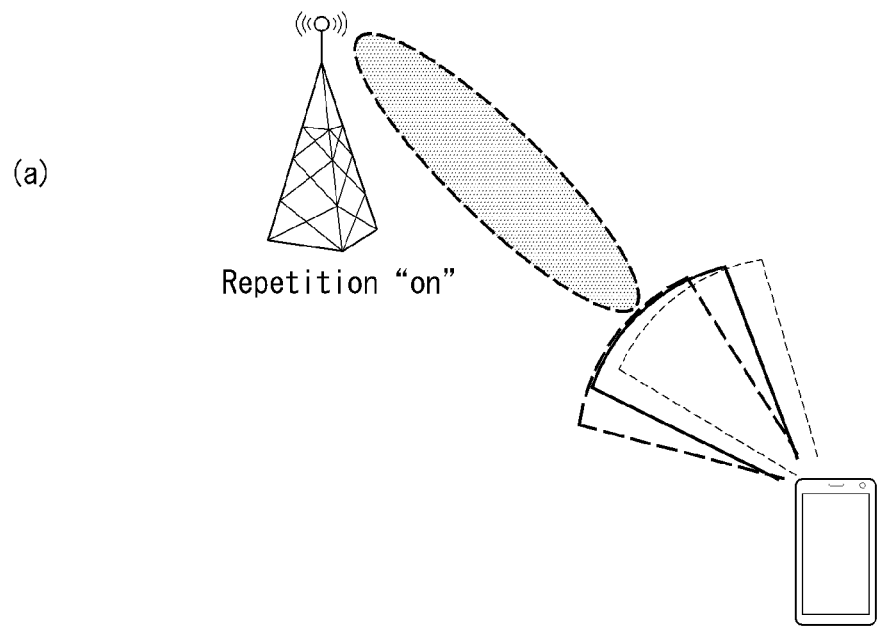
Repetition "on"
(b)
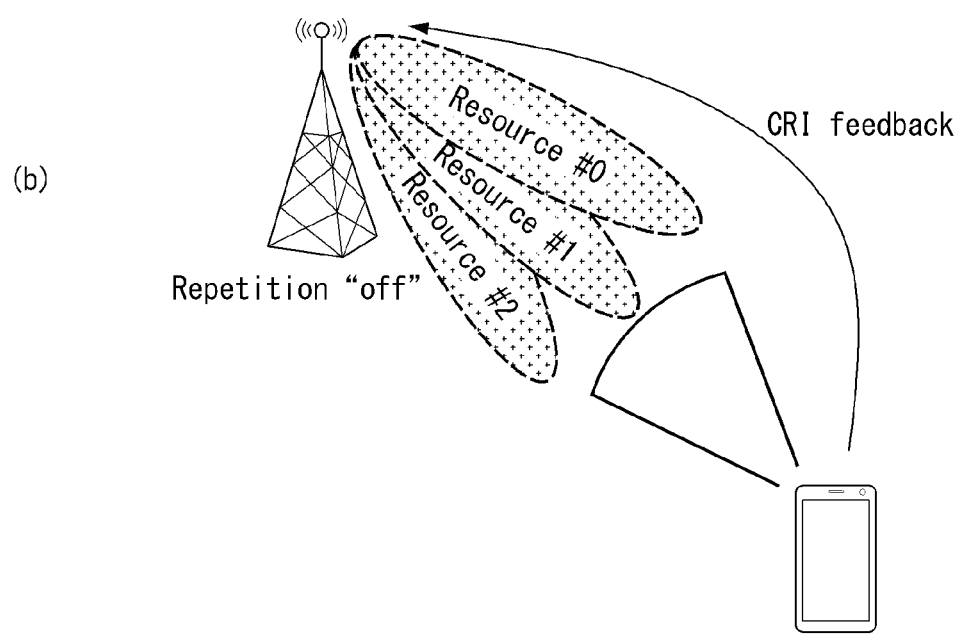
Repetition "off"
CRI feedback

[FIG. 15]
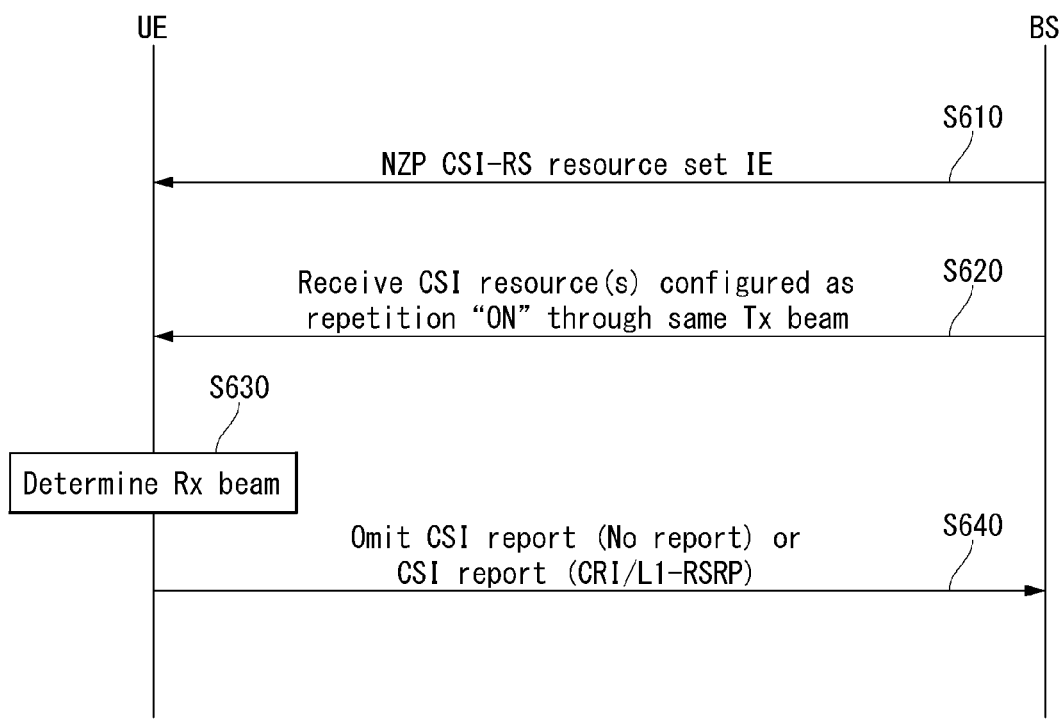

[FIG. 16]
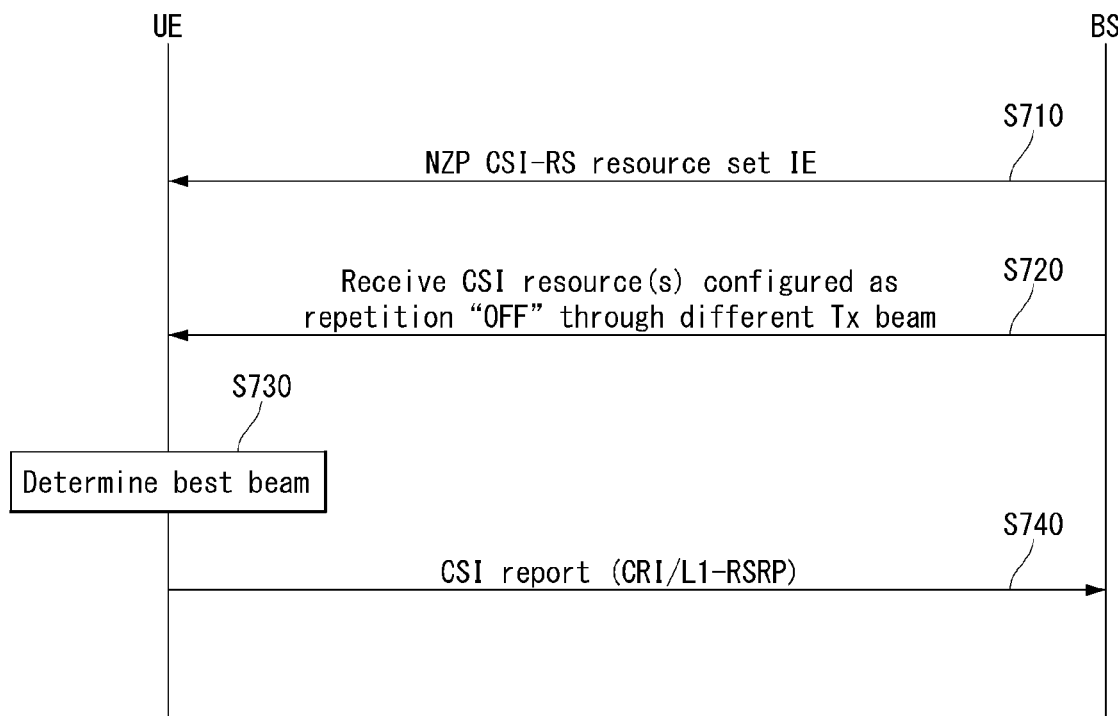
[FIG. 17]
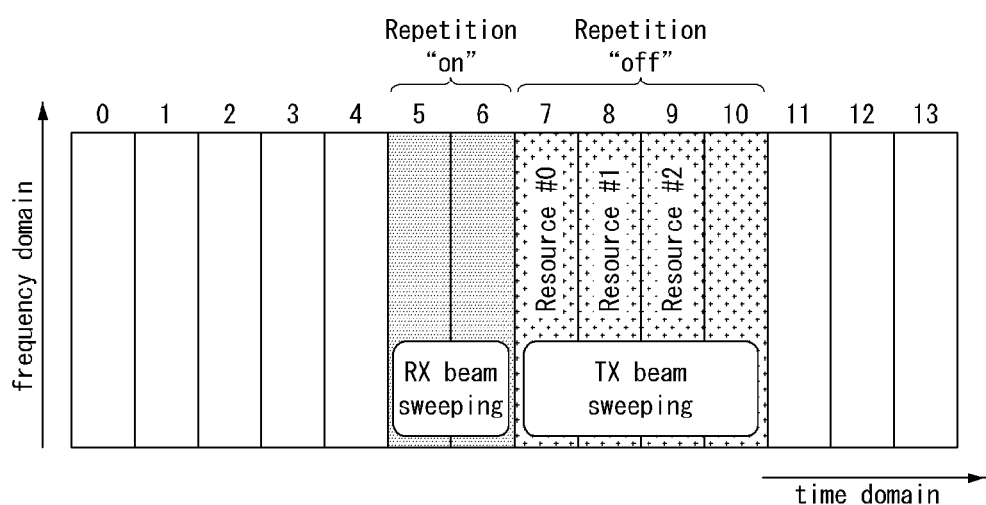

[FIG. 18]
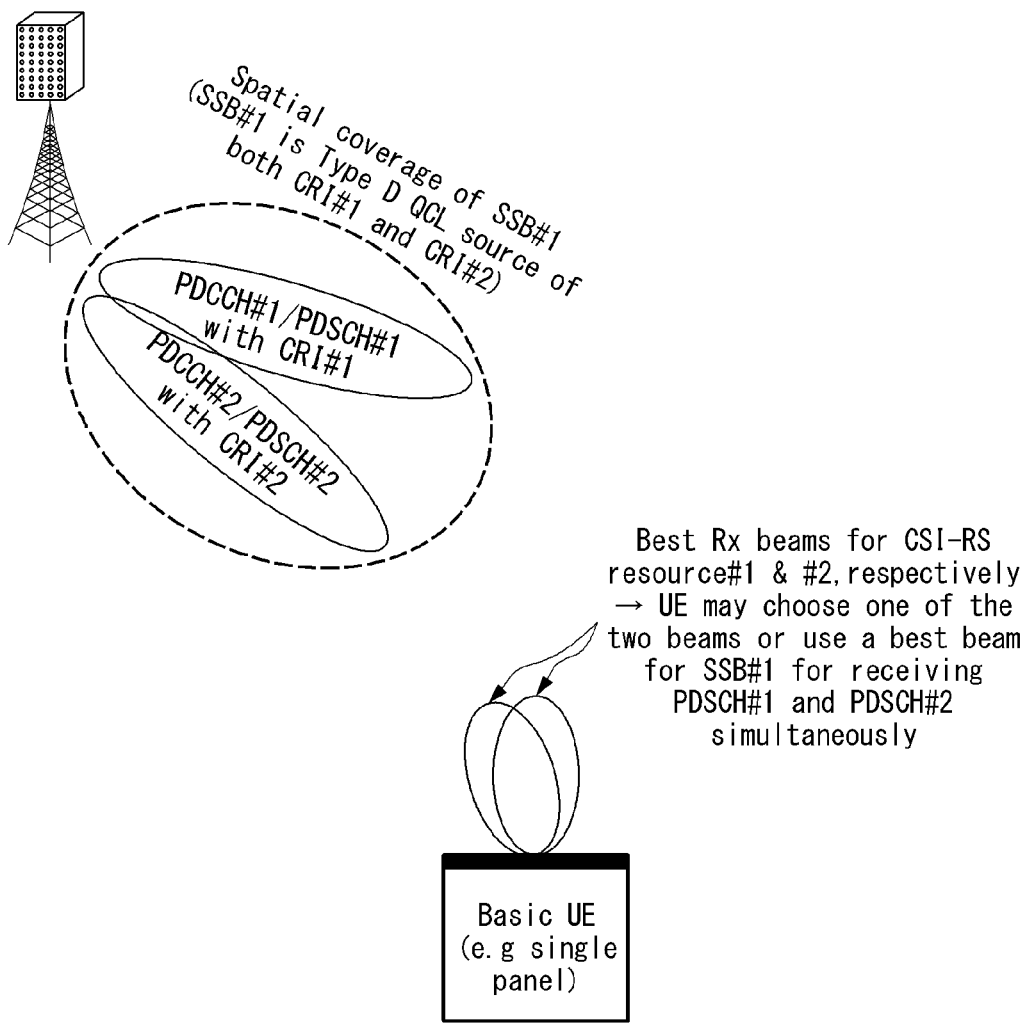

[FIG. 19]
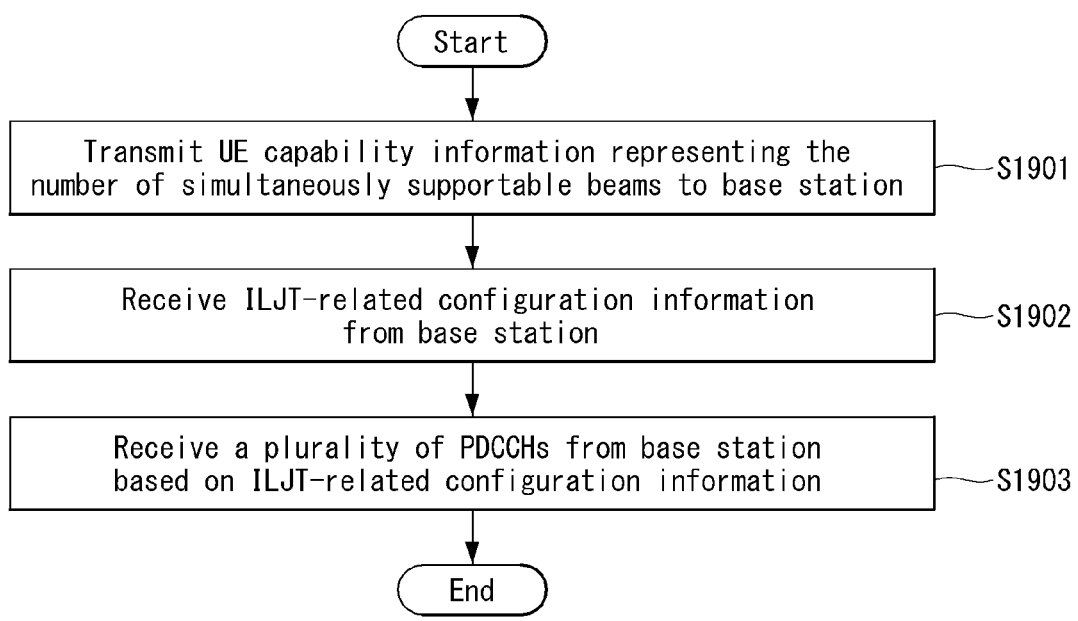

[FIG. 20]
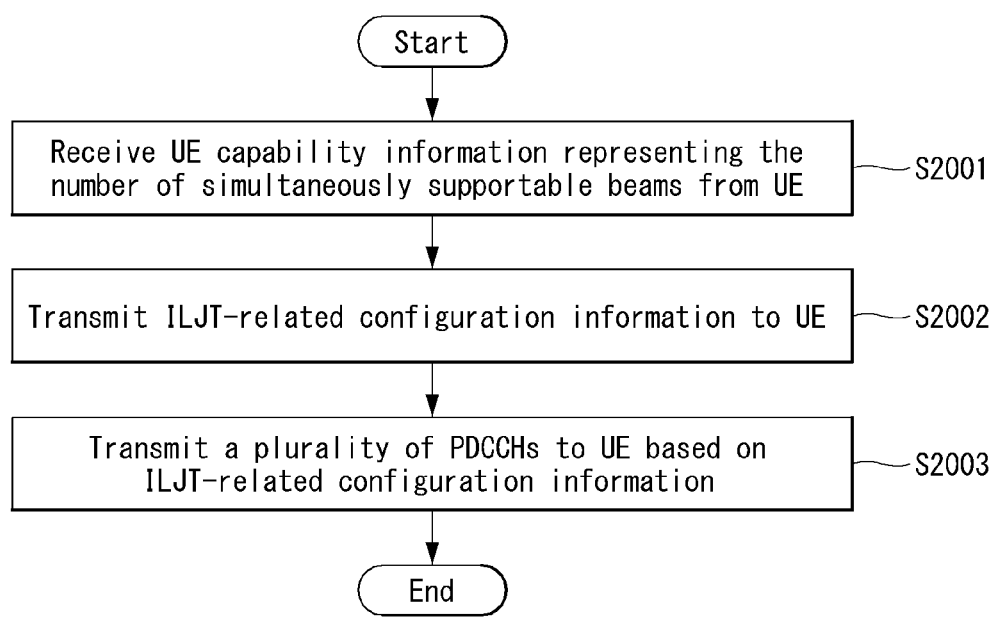

[FIG. 21]
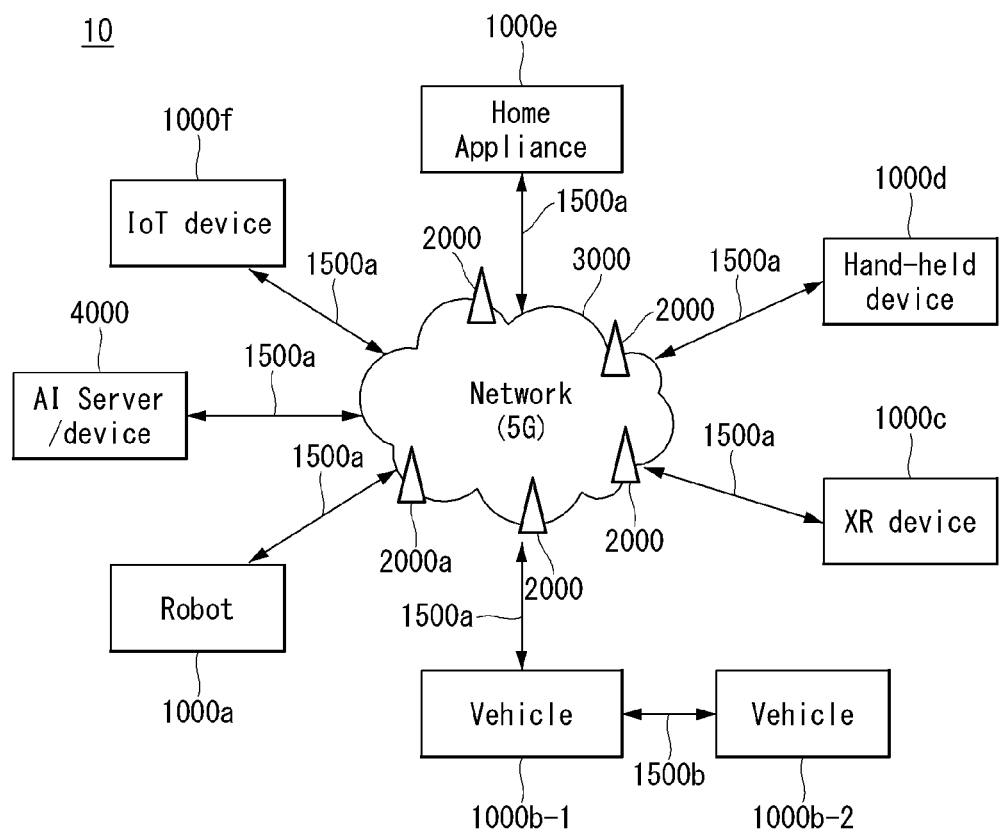

[FIG. 22]
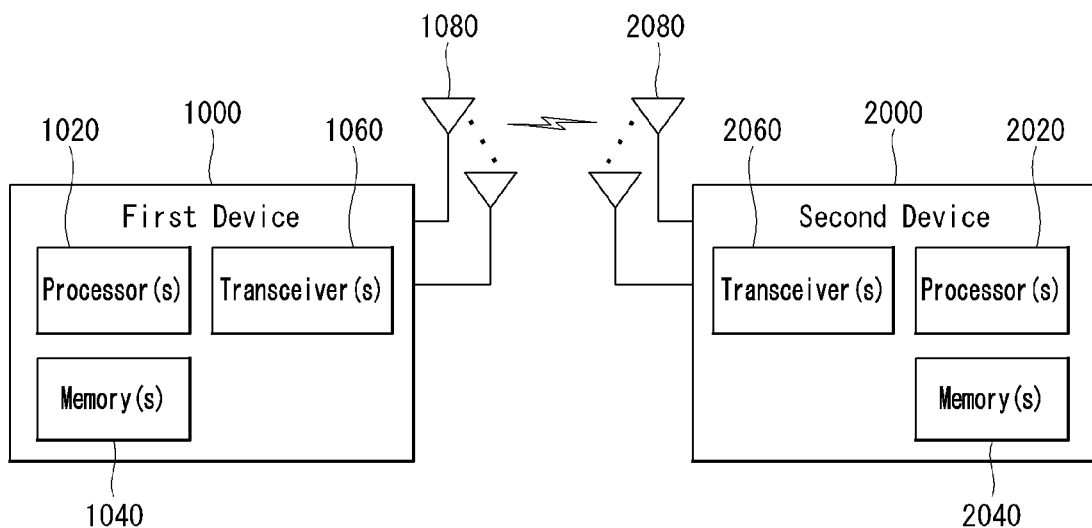
[FIG. 23]
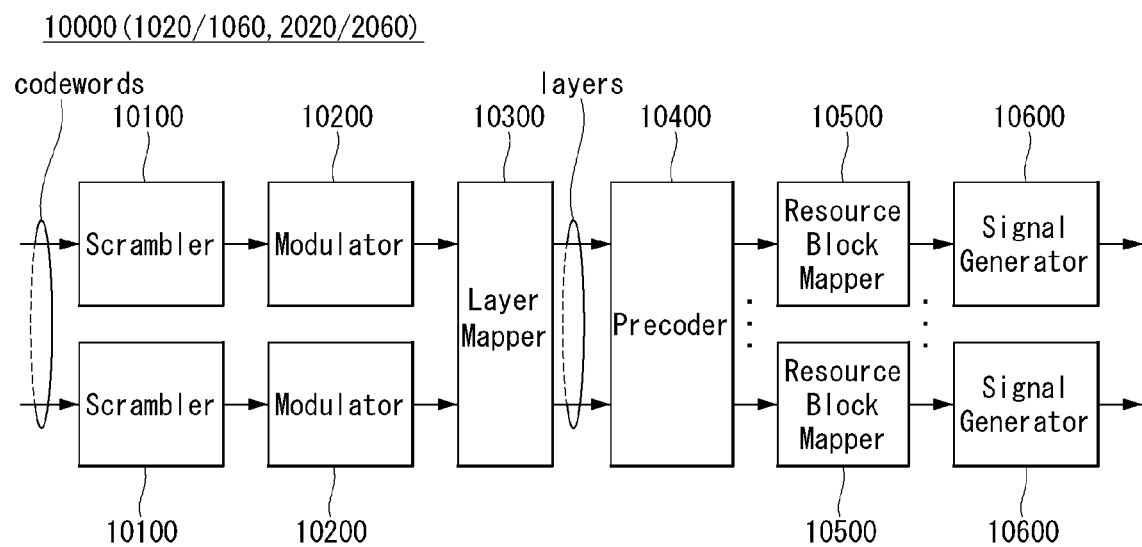

[FIG. 24]
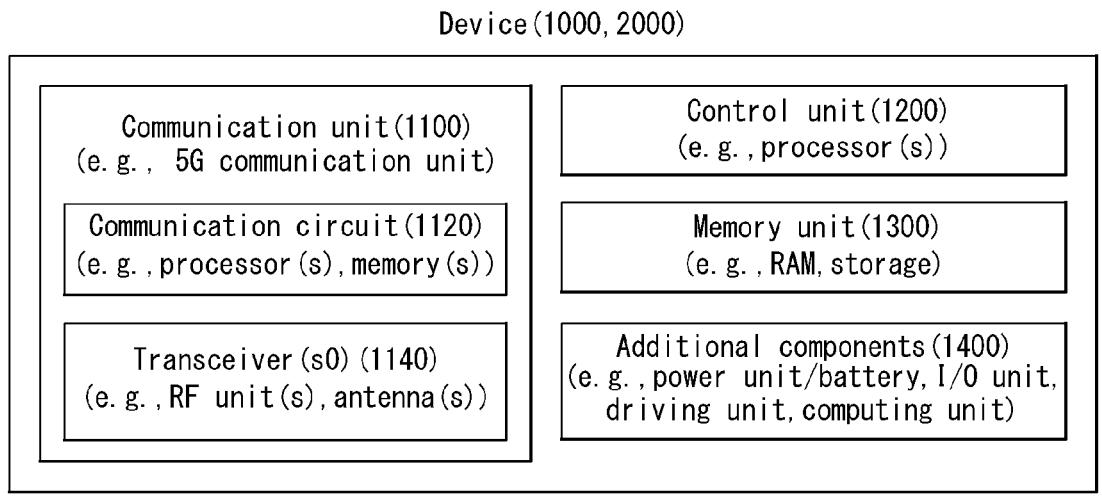
[FIG. 25]
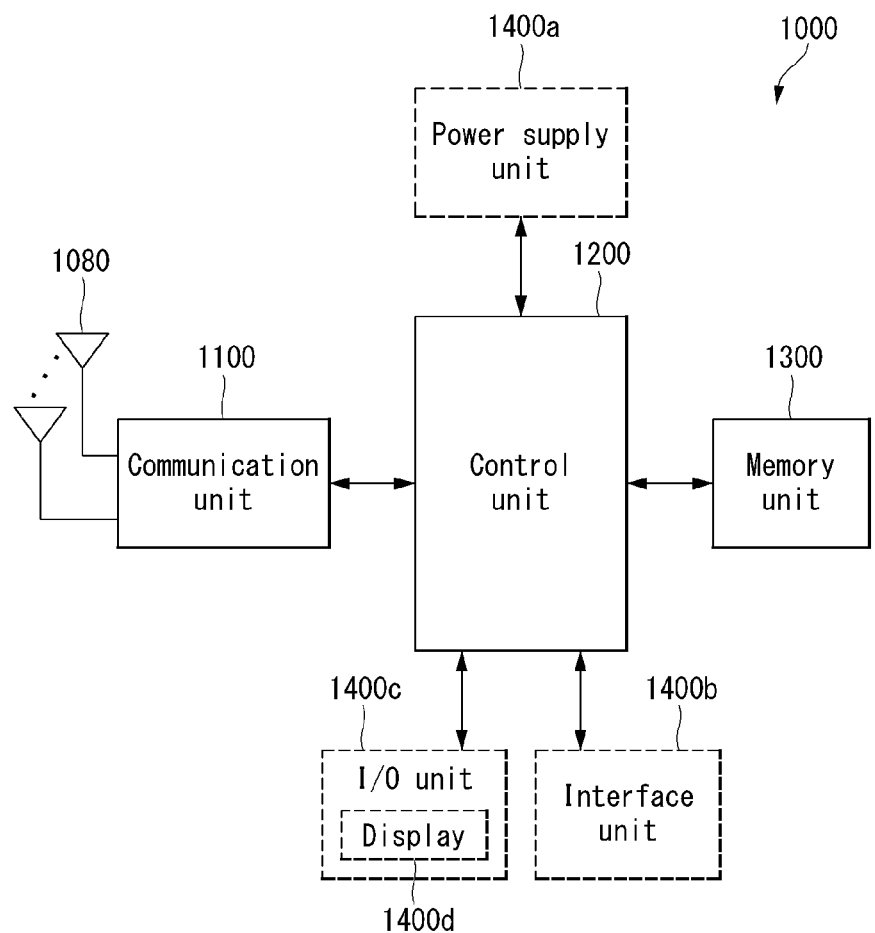

METHOD FOR TRANSMITTING AND RECEIVING PLURALITY OF PHYSICAL DOWNLINK CONTROL CHANNELS IN WIRELESS COMMUNICATION SYSTEM, AND DEVICE THEREFOR

This application is the National Stage filing under 35 U.S.C. 371 of International Application No. PCT/KR2020/000620 filed on Jan. 13, 2020, which claims priority to Korean Patent Application No. 10-2019-0003760 filed on Jan. 11, 2019, the contents of which are hereby incorporated by reference herein in their entirety.

TECHNICAL FIELD

The present disclosure relates to a wireless communication system, and more particularly to a method of transmitting and receiving a plurality of physical downlink control channels (PDCCHs) and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure provides a method of defining a default quasi co-location (QCL) source for receiving a plurality of physical downlink shared channels (PDSCHs) in case of a multi-physical downlink control channel (PDCCH) based independent layer joint transmission (ILJT) operation, and a device therefor.

The present disclosure also provides a method in which control resource sets (CORESETs) with different indexes are not configured for a user equipment (UE) simultaneously supporting one reception beam in the same bandwidth part (BWP), and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect of the present disclosure, there is provided a method of transmitting, by a base station, a plurality of physical downlink control channels (PDCCHs) in a wireless communication system, the method comprising receiving, from a user equipment (UE), UE capability information representing a number of simultaneously supportable beams, transmitting, to the UE, independent layer joint transmission (ILJT)-related configuration information, and transmitting, to the UE, the plurality of PDCCHs based on the ILJT-related configuration information, wherein the ILJT-related configuration information is determined based on the UE capability information.

The ILJT-related configuration information may include at least one of information for the plurality of PDCCHs scheduling a plurality of physical downlink shared channels (PDSCHs) that are overlapped, and/or information for a control resource set (CORESET).

The control resource set may be configured based on at least one index representing a group of a control resource set.

A number of the at least one index may be based on the UE capability information.

When the UE does not simultaneously support a plurality of beams, a control resource set may be configured based on one index.

When the UE simultaneously supports two beams, the control resource set may be configured based on two indexes. A first PDCCH of a control resource set with a first index may be transmitted from a different transmission and reception point, panel, or beam from a second PDCCH of a control resource set with a second index.

The first PDCCH may be received based on different QCL information for spatial parameter from the second PDCCH.

In another aspect of the present disclosure, there is provided a base station transmitting a plurality of physical downlink control channels (PDCCHs) in a wireless communication system, the UE comprising one or more transceivers, one or more processors, and one or more memories functionally connected to the one or more processors and storing instructions performing operations, wherein the operations include receiving, from a user equipment (UE), UE capability information representing a number of simultaneously supportable beams, transmitting, to the UE, independent layer joint transmission (ILJT)-related configuration information, and transmitting, to the UE, the plurality of PDCCHs based on the ILJT-related configuration information, wherein the ILJT-related configuration information is determined based on the UE capability information.

The ILJT-related configuration information may include at least one of information for the plurality of PDCCHs scheduling a plurality of physical downlink shared channels (PDSCHs) that are overlapped, and/or information for a control resource set (CORESET).

The control resource set may be configured based on at least one index representing a group of a control resource set.

A number of the at least one index may be based on the UE capability information.

When the UE does not simultaneously support a plurality of beams, a control resource set may be configured based on one index.

When the UE simultaneously supports two beams, the control resource set may be configured based on two indexes. A first PDCCH of a control resource set with a first index may be transmitted from a different transmission and reception point, panel, or beam from a second PDCCH of a control resource set with a second index.

The first PDCCH may be received based on different QCL information for spatial parameter from the second PDCCH.

In another aspect of the present disclosure, there is provided a device comprising one or more memories, and one or more processors functionally connected to the one or more memories, wherein the one or more processors are configured to allow the device to receive, from a user equipment (UE), UE capability information representing a number of simultaneously supportable beams, transmit, to the UE, independent layer joint transmission (ILJT)-related configuration information, and transmit, to the UE, the plurality of PDCCHs based on the ILJT-related configuration information, wherein the ILJT-related configuration information is determined based on the UE capability information.

In another aspect of the present disclosure, there is provided a non-temporary computer readable medium (CRM) storing one or more commands, wherein the one or more commands, that are executable by one or more processors, cause a base station to receive, from a user equipment (UE), UE capability information representing a number of simultaneously supportable beams, transmit, to the UE, independent layer joint transmission (ILJT)-related configuration information, and transmit, to the UE, the plurality of PDCCHs based on the ILJT-related configuration information, wherein the ILJT-related configuration information is determined based on the UE capability information.

Advantageous Effects

The present disclosure has an effect capable of receiving a plurality of PDSCHs transmitted from a plurality of base stations, etc. without ambiguity of reception beam configuration by defining default QCL information (or source) for receiving a plurality of PDSCHs in a multi-PDCCH based ILJT operation.

The present disclosure has an effect capable of implementing a low-latency and high reliable communication system by not configuring control resource sets with different group indexes for a UE simultaneously supporting one reception beam in the same bandwidth part.

The present disclosure has an effect capable of receiving a plurality of PDSCHs transmitted from a plurality of base stations, etc. without ambiguity of reception beam configuration, when TCI informations (or spatial QCL sources) of a plurality of PDSCHs that are scheduled after a request time for a beam change are different from each other.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an AI device to which a method described in the present disclosure is applicable.

FIG. 2 illustrates an AI server to which a method described in the present disclosure is applicable.

FIG. 3 illustrates an AI system to which a method described in the present disclosure is applicable.

FIG. 4 illustrates an example of an overall structure of an NR system to which a method described in the present disclosure is applicable.

FIG. 5 illustrates the relation between an uplink frame and a downlink frame in a wireless communication system to which a method described in the present disclosure is applicable.

FIG. 6 illustrates an example of a frame structure in an NR system.

FIG. 7 illustrates an example of a resource grid supported in a wireless communication system to which a method described in the present disclosure is applicable.

FIG. 8 illustrates examples of a resource grid per antenna port and numerology to which a method described in the present disclosure is applicable.

FIG. 9 illustrates an example of a self-contained structure to which a method described in the present disclosure is applicable.

FIG. 10 is a flow chart illustrating an example of a CSI-related procedure.

FIG. 11 is a concept view illustrating an example of a beam-related measurement model.

FIG. 12 illustrates an example of a DL BM procedure-related Tx beam.

FIG. 13 is a flow chart illustrating an example of a DL BM procedure using an SSB.

FIGS. 14(*a*) and 14(*b*) illustrate an example of a DL BM procedure using a CSI-RS.

FIG. 15 is a flow chart illustrating an example of a received beam determination process of a UE.

FIG. 16 is a flow chart illustrating an example of a method of determining, by a base station, a Tx beam.

FIG. 17 illustrates an example of resource allocation in time and frequency domains related to the operation of FIG. 14.

FIG. 18 illustrates an implementation of applying ILJT to a basic UE.

FIG. 19 is a flow chart illustrating an operation method of a UE described in the present disclosure.

FIG. 20 is a flow chart illustrating an operation method of a base station described in the present disclosure.

FIG. 21 illustrates a communication system 10 applied to the present disclosure.

FIG. 22 illustrates a wireless device applicable to the present disclosure.

FIG. 23 illustrates a signal processing circuit for a Tx signal.

FIG. 24 illustrates another example of a wireless device applied to the present disclosure.

FIG. 25 illustrates a portable device applied to the present disclosure.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-TDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method proposed in the disclosure may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

Automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 to which a method described in the present disclosure is applicable.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory

170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 to which a method described in the present disclosure is applicable.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 to which a method described in the present disclosure is applicable.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously run along a given flow without control of a user or that autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through a LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

As smartphones and Internet of Things (IoT) terminals are rapidly spread, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 4 illustrates an example of an overall structure of an NR system to which a method proposed in the disclosure may be applied.

Referring to FIG. 4, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
|---|---|---|
| FR1 | 410 MHz-7125MHz | 15, 30, 60 kHz |
| FR2 | 24250 MHz-52600MHz | 60, 120, 240 kHz |

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 2.

TABLE 2

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten sub-frames each having a section of $T_{sf}=(\Delta f_{max} N_f/1000) \cdot T_s=1$ ms. In this case, there may be a set of UL frames and a set of DL frames.

FIG. 5 illustrates the relation between an uplink frame and a downlink frame in a wireless communication system to which a method proposed in the disclosure may be applied.

As illustrated in FIG. 5, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 6 illustrates an example of a frame structure in an NR system. FIG. 6 is merely for convenience of explanation and does not limit the scope of the disclosure.

In Table 3, in the case of μ=2, i.e., as an example in which a subcarrier spacing (SCS) is 60 kHz, one subframe (or frame) may include four slots with reference to Table 4, and one subframe={1, 2, 4} slots shown in FIG. 6, for example, the number of slot(s) that may be included in one subframe may be defined as in Table 4.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 7 illustrates an example of a resource grid supported in a wireless communication system to which a method proposed in the disclosure may be applied.

Referring to FIG. 7, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 8, one resource grid may be configured per numerology μ and antenna port p.

FIG. 8 illustrates examples of a resource grid per antenna port and numerology to which a method proposed in the disclosure may be applied.

Each element of the resource grid for the numerology μ and the antenna port p is called a resource element and is uniquely identified by an index pair (k,l̄), where k=0, ..., $N_{RB}^\mu N_{sc}^{RB}-1$ an index on a frequency domain, and l̄=0, ..., $2^\mu N_{symb}^{(\mu)}-1$ refers to a location of a symbol in a subframe. The index pair (k,l̄) is used to refer to a resource element in a slot, where l=0, ..., $N_{symb}^\mu-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, 1) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start}$$ [Equation 2]

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 9 illustrates an example of a self-contained structure to which a method proposed in the disclosure may be applied. FIG. 9 is merely for convenience of explanation and does not limit the scope of the disclosure.

Referring to FIG. 9, as in legacy LTE, it is assumed that one transmission unit (e.g., slot, subframe) consists of 14 orthogonal frequency division multiplexing (OFDM) symbols.

In FIG. 9, a region 902 means a downlink control region, and a region 904 means an uplink control region. Further, regions (i.e., regions without separate indication) other than the region 902 and the region 904 may be used for transmission of downlink data or uplink data.

That is, uplink control information and downlink control information may be transmitted in one self-contained slot. On the other hand, in the case of data, uplink data or downlink data is transmitted in one self-contained slot.

When the structure illustrated in FIG. 9 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 9, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

Channel State Information (CSI) Related Procedure

In a new radio (NR) system, a channel state information-reference signal (CSI-RS) is used for time/frequency tracking, CSI computation, layer 1 (L1)-reference signal received power (RSRP) computation, and mobility.

"A and/or B" used in the present disclosure may be interpreted as the same meaning as that "A and/or B" includes at least one of A or B."

The CSI computation is related to CSI acquisition, and the L1-RSRP computation is related to beam management (BM).

Channel state information (CSI generally refers to information which may indicate the quality of a radio channel (or also called a link) formed between a UE and an antenna port.

An operation of a UE for a CSI-related procedure is described.

FIG. 10 is a flowchart illustrating an example of a CSI-related procedure.

In order to perform one of uses of a CSI-RS described above, a terminal (e.g., user equipment (UE)) receives, from a base station (e.g., general Node B or gNB), configuration information related to CSI through radio resource control (RRC) signaling (S110).

The configuration information related to the CSI may include at least one of CSI-interference management (IM) resource-related information, CSI measurement configuration-related information, CSI resource configuration-related information, CSI-RS resource-related information, or CSI report configuration-related information.

The CSI-IM resource-related information may include CSI-IM resource information, CSI-IM resource set information, etc.

A CSI-IM resource set is identified by a CSI-IM resource set identifier (ID). One resource set includes at least one CSI-IM resource.

Each CSI-IM resource is identified by a CSI-IM resource ID.

The CSI resource configuration-related information defines a group including at least one of a non zero power (NZP) CSI-RS resource set, a CSI-IM resource set, or a CSI-SSB resource set.

That is, the CSI resource configuration-related information includes a CSI-RS resource set list. The CSI-RS resource set list may include at least one of an NZP CSI-RS resource set list, a CSI-IM resource set list, or a CSI-SSB resource set list.

The CSI resource configuration-related information may be represented as a CSI-ResourceConfig IE.

The CSI-RS resource set is identified by a CSI-RS resource set ID. One resource set includes at least one CSI-RS resource.

Each CSI-RS resource is identified by a CSI-RS resource ID.

As in Table 5, parameters (e.g., a BM-related "repetition" parameter and a tracking-related "trs-Info" parameter) indicating the use of a CSI-RS for each NZP CSI-RS resource set may be configured.

Table 5 illustrates an example of the NZP CSI-RS resource set IE.

TABLE 5

```
-- ASN1START
-- TAG-NZP-CSI-RS-RESOURCESET-START
NZP-CSI-RS-ResourceSet ::=    SEQUENCE {
    nzp-CSI-ResourceSetId         NZP-CSI-RS-ResourceSetId,
    nzp-CSI-RS-Resources          SEQUENCE (SIZE (1..maxNrofNZP-
CSI-RS-ResourcesPerSet)) OF NZP-CSI-RS-ResourceId,
    repetition                    ENUMERATED { on, off }
    aperiodicTriggeringOffset     INTEGER(0..4)
    trs-Info                      ENUMERATED {true}
    ...
}
-- TAG-NZP-CSI-RS-RESOURCESET-STOP
-- ASN1 STOP
```

In Table 5, the repetition parameter is a parameter indicating whether the same beam is repeatedly transmitted, and indicates whether a repetition is "ON" or "OFF" for each NZP CSI-RS resource set. A transmit/transmission (Tx) beam used in the present disclosure may be interpreted as the same meaning as a spatial domain transmission filter. A receive/reception (Rx) beam used in the present disclosure may be interpreted as the same meaning as a spatial domain reception filter.

For example, if the repetition parameter in Table 5 is configured as "OFF", a UE does not assume that an NZP CSI-RS resource(s) within a resource set is transmitted as the same Nrofports as the same DL spatial domain transmission filter in all symbols.

Furthermore, the repetition parameter corresponding to a higher layer parameter corresponds to "CSI-RS-ResourceRep" of an L1 parameter.

The CSI report configuration-related information includes a report configuration type (reportConfigType) parameter indicating a time domain behavior and a report quantity (reportQuantity) parameter indicating CSI-related quantity for reporting.

The time domain behavior may be periodic, aperiodic or semi-persistent.

Furthermore, the CSI report configuration-related information may be represented as a CSI-ReportConfig IE. Table 6 below illustrates an example of a CSI-ReportConfig IE.

ment may include (1) a CSI-RS reception process S121 of the UE and (2) a process S122 of computing CSI through a received CSI-RS.

A sequence for a CSI-RS is generated by Equation 3 below. An initialization value of a pseudo-random sequence C(i) is defined by Equation 4.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

$$c_{init} = (2^{10}(N_{symb}^{slot}n_{s,f}^{\mu} + 1 + 1)(2n_{ID} + 1) + n_{ID}) \bmod 2^{31} \quad \text{[Equation 4]}$$

In Equations 3 and 4, $n_{s,f}^{\mu}$ indicates a slot number within a radio frame, and a pseudo-random sequence generator is initialized as Cint at the start of each OFDM symbol, that is, $n_{s,f}^{\mu}$.

Furthermore, 1 is an OFDM symbol number within a slot. $n_{ID}$ is identical with a higher-layer parameter scramblingID.

Furthermore, in the CSI-RS, resource element (RE) mapping of a CSI-RS resource is configured in time and fre-

TABLE 6

```
-- ASN1START
-- TAG-CSI-RESOURCECONFIG-START
CSI-ReportConfig ::=                        SEQUENCE {
    reportConfigId                              CSI-ReportConfigId,
    carrier                                     ServCellIndex               OPTIONAL, -
    resourcesForChannelMeasurement              CSI-ResourceConfigId,
    csi-IM-ResourcesForInterference             CSI-ResourceConfigId        OPTIONAL, -
    nzp-CSI-RS-ResourcesForInterference         CSI-ResourceConfigId        OPTIONAL, -
    reportConfigType                            CHOICE {
        periodic                                    SEQUENCE {
            reportSlotConfig                            CSI-ReportPeriodicityAndOffset,
            pucch-CSI-ResourceList                      SEQUENCE (SIZE
(1..maxNrofBWPs)) OF PUCCH-CSI-Resource
        },
        semiPersistentOnPUCCH                       SEQUENCE {
            reportSlotConfig                            CSI-ReportPeriodicityAndOffset,
            pucch-CSI-ResourceList                      SEQUENCE (SIZE
(1..maxNrofBWPs)) OF PUCCH-CSI-Resource
        },
        semiPersistentOnPUSCH                       SEQUENCE {
            reportSlotConfig                            ENUMERATED {sl5, sl10, sl20, sl40,
sl80, sl160, sl320},
            reportSlotOffsetList                        SEQUENCE (SIZE (1.. maxNrofUL-
Allocations)) OF INTEGER(0..32),
            p0alpha                                     P0-PUSCH-AlphaSetId
        },
        aperiodic                                   SEQUENCE {
            reportSlotOffsetList                        SEQUENCE (SIZE (1..maxNrofUL-
Allocations)) OF INTEGER(0..32)
        }
    },
    reportQuantity                              CHOICE {
        none                                        NULL,
        cri-RI-PMI-CQI                              NULL,
        cri-RI-i1                                   NULL,
        cri-RI-i1-CQI                               SEQUENCE {
            pdsch-BundleSizeForCSI                      ENUMERATED {n2, n4}
        OPTIONAL
        },
        cri-RI-CQI                                  NULL,
        cri-RSRP                                    NULL,
        ssb-Index-RSRP                              NULL,
        cri-RI-LI-PMI-CQI                           NULL
    },
```

Furthermore, the UE measures CSI based on the configuration information related to CSI (S120). The CSI measurequency domains by a higher layer parameter CSI-RS-ResourceMapping.

Table 7 illustrates an example of a CSI-RS-ResourceMapping IE.

TABLE 7

```
-- ASN1START
-- TAG-CSI-RS-RESOURCEMAPPING-START
CSI-RS-ResourceMapping ::=      SEQUENCE {
   frequencyDomainAllocation       CHOICE {
      row1                            BIT STRING (SIZE (4)),
      row2                            BIT STRING (SIZE (12)),
      row4                            BIT STRING (SIZE (3)),
      other                           BIT STRING (SIZE (6))
   },
   nrofPorts                       ENUMERATED {p1,p2,p4,p8,p12,p16,p24,p32},
   firstOFDMSymbolInTimeDomain        INTEGER (0..13),
   firstOFDMSymbolInTimeDomain2    INTEGER (2..12)
   cdm-Type                        ENUMERATED {noCDM, fd-CDM2, cdm4-FD2-
TD2, cdm8-FD2-TD4},
   density                         CHOICE {
      dot5                            ENUMERATED {evenPRBs, oddPRBs},
      one                             NULL,
      three                           NULL,
      spare                           NULL
   },
   freqBand                        CSI-FrequencyOccupation,
   ...
}
```

In Table 7, density D indicates the density of CSI-RS resources measured in an RE/port/physical resource block (PRB). nrofPorts indicates the number of antenna ports. Furthermore, the UE reports the measured CSI to the base station (S130).

In this case, if the quantity of CSI-ReportConfig is configured as "none (or No report)" in Table 7, the UE may omit the report.

However, although the quantity is configured as "none (or No report)", the UE may report the measured CSI to the base station.

A case where the quantity is configured as "none" is a case where an aperiodic TRS is triggered or a case where a repetition is configured.

In this case, the reporting of the UE may be defined to be omitted only when the repetition is configured as "ON."

In summary, if the repetition is configured as "ON" and "OFF", CSI reporting may include all of "No report", "SSB resource indicator (SSBRI) and L1-RSRP", and "CSI-RS resource indicator (CRI) and L1-RSRP."

Alternatively, if the repetition is "OFF", the CSI reporting of "SSBRI and L1-RSRP" or "CRI and L1-RSRP" may be defined to be transmitted. If the repetition is "ON", the CSI reporting of "No report", "SSBRI and L1-RSRP", or "CRI and L1-RSRP" may be defined to be transmitted.

Beam Management (BM) Procedure

A beam management (BM) procedure defined in new radio (NR) is described.

The BM procedure corresponds to layer 1 (L1)/L2 (layer 2) procedures for obtaining and maintaining a set of base station (e.g., gNB or TRP) and/or a terminal (e.g., UE) beams which may be used for downlink (DL) and uplink (UL) transmission/reception, and may include the following procedure and terms.

Beam measurement: an operation of measuring characteristics of a beamforming signal received by a base station or a UE.

Beam determination: an operation of selecting, by a base station or a UE, its own transmission (Tx) beam/reception (Rx) beam.

Beam sweeping: an operation of covering a space region by using a transmission beam and/or a reception beam for a given time interval in a predetermined manner Beam report: an operation of reporting, by a UE, information of a beamformed signal based on beam measurement.

FIG. 11 is a concept view illustrating an example of a beam-related measurement model.

For beam measurement, an SS block (or SS/PBCH block (SSB)) or a channel state information reference signal (CSI-RS) is used in the downlink. A sounding reference signal (SRS) is used in the uplink.

In RRC_CONNECTED, a UE measures multiple beams (or at least one beam) of a cell. The UE may average measurement results (RSRP, RSRQ, SINR, etc.) in order to derive cell quality.

Accordingly, the UE may be configured to consider a sub-set of a detected beam(s).

Beam measurement-related filtering occurs in different two levels (in a physical layer that derives beam quality and an RRC level in which cell quality is derived from multiple beams).

Cell quality from beam measurement is derived in the same manner with respect to a serving cell(s) and a non-serving cell)(s).

If a UE is configured by a gNB to report measurement results for a specific beam(s), a measurement report includes measurement results for X best beams. The beam measurement results may be reported as L1-reference signal received power (RSRP).

In FIG. 11, K beams (gNB beam 1, gNB beam 2, ..., gNB beam k) 210 are configured for L3 mobility by a gNB, and correspond to the measurement of a synchronization signal (SS) block (SSB) or CSI-RS resource detected by a UE in the L1.

In FIG. 11, layer 1 filtering 220 means internal layer 1 filtering of an input measured at a point A.

Furthermore, in beam consolidation/selection 230, beam-specific measurements are integrated (or merged) in order to derive cell quality.

Layer 3 filtering 240 for cell quality means filtering performed on measurement provided at a point B.

A UE evaluates a reporting criterion whenever new measurement results are reported at least at points C and C1.

D corresponds to measurement report information (message) transmitted at a radio interface.

In L3 beam filtering 250, filtering is performed on measurement (beam-specific measurement) provided at a point A1.

In beam selection 260 for a beam report, X measurement values are selected in measurement provided at a point E.

F indicates beam measurement information included in a measurement report (transmission) in a radio interface.

In this case, one SS burst includes one or more SSBs, and one SS burst set includes one or more SSB bursts.

DL BM Procedure Using SSB

FIG. 13 is a flowchart illustrating an example of a DL BM procedure using an SSB.

A configuration for a beam report using an SSB is performed upon CSI/beam configuration in an RRC connected state (or RRC connected mode).

As in a CSI-ResourceConfig IE of Table 8, a BM configuration using an SSB is not separately defined, and an SSB is configured like a CSI-RS resource.

Table 8 illustrates an example of the CSI-ResourceConfig IE.

TABLE 8

```
-- ASN1START
-- TAG-CSI-RESOURCECONFIG-START
CSI-ResourceConfig ::=                  SEQUENCE {
    csi-ResourceConfigId                CSI-ResourceConfigId,
    csi-RS-ResourceSetList              CHOICE {
        nzp-CSI-RS-SSB                  SEQUENCE {
            nzp-CSI-RS-ResourceSetList          SEQUENCE (SIZE (1..maxNrofNZP-
CSI-RS-ResourceSetsPerConfig)) OF NZP-CSI-RS-ResourceSetId OPTIONAL,
            csi-SSB-ResourceSetList             SEQUENCE (SIZE (1..maxNrofCSI-
SSB-ResourceSetsPerConfig)) OF CSI-SSB-ResourceSetId OPTIONAL
        },
        csi-IM-ResourceSetList              SEQUENCE (SIZE (1..maxNrofCSI-IM-
ResourceSetsPerConfig)) OF CSI-IM-ResourceSetId
    },
    bwp-Id                              BWP-Id,
    resourceType                        ENUMERATED { aperiodic, semiPersistent,
periodic },
    ...
}
-- TAG-CSI-RESOURCECONFIGTOADDMOD-STOP
-- ASN1STOP
```

Furthermore, the BM procedure may be divided into (1) a DL BM procedure using a synchronization signal (SS)/physical broadcast channel (PBCH) Block or CSI-RS and (2) an UL BM procedure using a sounding reference signal (SRS).

Furthermore, each of the BM procedures may include Tx beam sweeping for determining a Tx beam and Rx beam sweeping for determining an Rx beam.

DL BM Procedure

First, the DL BM procedure is described.

The DL BM procedure may include (1) the transmission of beamformed DL reference signals (RSs) (e.g., CSI-RS or SS block (SSB)) of a base station and (2) beam reporting of a UE.

In this case, the beam reporting may include a preferred DL RS identifier (ID)(s) and L1-reference signal received power (RSRP) corresponding thereto.

The DL RS ID may be an SSB resource indicator (SSBRI) or a CSI-RS resource indicator (CRI).

FIG. 12 illustrates an example of a DL BM procedure-related Tx beam.

As illustrated in FIG. 12, an SSB beam and a CSI-RS beam may be used for beam measurement.

In this case, a measurement metric is L1-RSRP for each resource/block.

An SSB may be used for coarse beam measurement, and a CSI-RS may be used for fine beam measurement.

Furthermore, the SSB may be used for both Tx beam sweeping and Rx beam sweeping.

A UE may perform the Rx beam sweeping using an SSB while changing an Rx beam with respect to the same SSBRI across multiple SSB bursts.

In Table 8, the csi-SSB-ResourceSetList parameter indicates a list of SSB resources used for beam management and reporting in one resource set. A UE receives, from a base station, a CSI-ResourceConfig IE including CSI-SSB-ResourceSetList including SSB resources used for BM (S410).

In this case, the SSB resource set may be configured with {SSBx1, SSBx2, SSBx3, SSBx4, . . . }.

An SSB index may be defined from 0 to 63.

Furthermore, the UE receives an SSB resource from the base station based on the CSI-SSB-ResourceSetList (S420).

Furthermore, if CSI-RS reportConfig related to a report for an SSBRI and L1-RSRP has been configured, the UE (beam) reports, to the base station, the best SSBRI and L1-RSRP corresponding thereto (S430).

That is, if reportQuantity of the CSI-RS reportConfig IE is configured as "ssb-Index-RSRP", the UE reports the best SSBRI and the L1-RSRP corresponding thereto to the base station.

Furthermore, if a CSI-RS resource is configured in an OFDM symbol(s) identical with an SS/PBCH block (SSB) and "QCL-TypeD" is applicable, the UE may assume that a CSI-RS and an SSB are quasi co-located from a "QCL-TypeD" viewpoint.

In this case, the QCL TypeD may mean that antenna ports have been QCLed from a spatial Rx parameter viewpoint. When the UE receives a plurality of DL antenna ports having a QCL Type D relation, the same Rx beam may be applied.

Furthermore, the UE does not expect that a CSI-RS will be configured in an RE that overlaps an RE of an SSB.

DL BM Procedure Using CSI-RS

If a UE is configured with NZP-CSI-RS-ResourceSet having a (higher layer parameter) repetition configured as "ON", the UE may assume that at least one CSI-RS resource within the NZP-CSI-RS-ResourceSet is transmitted as the same downlink spatial domain transmission filter.

That is, at least one CSI-RS resource within the NZP-CSI-RS-ResourceSet is transmitted through the same Tx beam.

In this case, the at least one CSI-RS resource within the NZP-CSI-RS-ResourceSet may be transmitted in different OFDM symbols or may be transmitted in different frequency domains (i.e., through FDM).

A case where the at least one CSI-RS resource is FDMed is a case where a UE is a multi-panel UE.

Furthermore, a case where a repetition is configured as "ON" is related to an Rx beam sweeping procedure of a UE.

The UE does not expect that different periodicities will be received in periodicityAndOffset in all CSI-RS resources within NZP-CSI-RS-Resourceset.

Furthermore, if the repetition is configured as "OFF", the UE does not assume that at least one CSI-RS resource within NZP-CSI-RS-ResourceSet is transmitted as the same downlink spatial domain transmission filter.

That is, the at least one CSI-RS resource within NZP-CSI-RS-ResourceSet is transmitted through different Tx beams.

A case where the repetition is configured as "OFF" is related to a Tx beam sweeping procedure of a base station.

Furthermore, the repetition parameter may be configured only with respect to CSI-RS resource sets associated with CSI-ReportConfig having the reporting of L1 RSRP or "No Report (or None)."

If a UE is configured with CSI-ReportConfig having reportQuantity configured as "cri-RSRP" or "none" and CSI-ResourceConfig (higher layer parameter resourcesForChannelMeasurement) for channel measurement does not include a higher layer parameter "trs-Info" and includes NZP-CSI-RS-ResourceSet configured (repetition=ON) as a higher layer parameter "repetition", the UE may be configured with only the same number of ports (1-port or 2-port) having a higher layer parameter "nrofPorts" with respect to all CSI-RS resources within the NZP-CSI-RS-ResourceSet.

More specifically, CSI-RS uses are described. If a repetition parameter is configured in a specific CSI-RS resource set and TRS_info is not configured, a CSI-RS is used for beam management.

Furthermore, if a repetition parameter is not configured and TRS_info is configured, a CSI-RS is used for a tracking reference signal (TRS).

Furthermore, if a repetition parameter is not configured and TRS_info is not configured, a CSI-RS is used for CSI acquisition.

FIG. 14 illustrates an example of a DL BM procedure using a CSI-RS.

FIG. 14(a) illustrates an Rx beam determination (or refinement) procedure of a UE. FIG. 14(b) indicates a Tx beam determination procedure of a base station.

Furthermore, FIG. 14(a) corresponds to a case where the repetition parameter is configured as "ON", and FIG. 14(b) corresponds to a case where the repetition parameter is configured as "OFF."

An Rx beam determination process of a UE is described with reference to FIGS. 14(a) and 15.

FIG. 15 is a flowchart illustrating an example of a received beam determination process of a UE.

The UE receives, from a base station, an NZP CSI-RS resource set IE including a higher layer parameter repetition through RRC signaling (S610).

In this case, the repetition parameter is configured as "ON."

Furthermore, the UE repeatedly receives a resource(s) within a CSI-RS resource set configured as a repetition "ON" in different OFDM symbols through the same Tx beam (or DL spatial domain transmission filter) of the base station (S620).

Accordingly, the UE determines its own Rx beam (S630).

In this case, the UE omits a CSI report or transmits, to the base station, a CSI report including a CRI/L1-RSRP (S640).

In this case, reportQuantity of the CSI report config may be configured as "No report (or None)" or "CRI+L1-RSRP."

That is, if a repetition "ON" is configured, the UE may omit a CSI report. Alternatively, the UE may report ID information (CRI) for a beam pair-related preference beam and a corresponding quality value (L1-RSRP).

A Tx beam determination process of a base station is described with reference to FIGS. 14(b) and 16.

FIG. 16 is a flowchart illustrating an example of a method of determining, by a base station, a transmission beam.

A UE receives, from a base station, an NZP CSI-RS resource set IE including a higher layer parameter repetition through RRC signaling (S710).

In this case, the repetition parameter is configured as "OFF", and is related to a Tx beam sweeping procedure of the base station.

Furthermore, the UE receives resources within the CSI-RS resource set configured as the repetition "OFF" through different Tx beams (DL spatial domain transmission filters) of the base station (S720).

Furthermore, the UE selects (or determines) the best beam (S740), and reports an ID for the selected beam and related quality information (e.g., L1-RSRP) to the base station (S740).

In this case, reportQuantity of the CSI report config may be configured as "CRI+L1-RSRP."

That is, the UE reports a CRI and corresponding L1-RSRP to the base station if a CSI-RS is transmitted for BM.

FIG. 17 illustrates an example of resource allocation in time and frequency domains related to the operation of FIG. 14.

That is, it may be seen that if the repetition "ON" has been configured in a CSI-RS resource set, a plurality of CSI-RS resources is repeatedly used by applying the same Tx beam, and if a repetition "OFF" has been configured in the CSI-RS resource set, different CSI-RS resources are transmitted through different Tx beams.

DL BM-Related Beam Indication

A UE may be RRC-configured with a list of a maximum of M candidate transmission configuration indication (TCI) states for an object of at least quasi co-location (QCL) indication. In this case, M may be 64.

Each of the TCI states may be configured as one RS set.

Each ID of a DL RS for at least a spatial QCL purpose (QCL Type D) within the RS set may refer to one of DL RS types, such as an SSB, a P-CSI RS, an SP-CSI RS, and an A-CSI RS.

The initialization/update of an ID of a DL RS(s) within the RS set used for the at least spatial QCL purpose may be performed through at least explicit signaling.

Table 9 illustrates an example of a TCI-State IE.

The TCI-State IE associates one or two DL reference signals (RS) with a corresponding quasi co-location (QCL) type.

TABLE 9

```
-- ASN1START
-- TAG-TCI-STATE-START
TCI-State ::=        SEQUENCE {
    tci-StateId      TCI-StateId,
    qcl-Type1        QCL-Info,
    qcl-Type2        QCL-Info
    ...
}
QCL-Info ::=         SEQUENCE {
    cell             ServCellIndex
    bwp-Id           BWP-Id
    referenceSignal  CHOICE {
        csi-rs           NZP-CSI-RS-ResourceId,
        ssb              SSB-Index
    },
    qcl-Type         ENUMERATED {typeA, typeB, typeC, typeD},
    ...
}
-- TAG-TCI-STATE-STOP
-- ASN1STOP
```

In Table 9, the bwp-Id parameter indicates a DL BWP where an RS is located. The cell parameter indicates a carrier where an RS is located. The reference signal parameter indicates a reference antenna port(s) that becomes the source of a quasi co-location for a corresponding target antenna port(s) or a reference signal including the reference antenna port(s). A target antenna port(s) may be a CSI-RS, a PDCCH DMRS, or a PDSCH DMRS. For example, in order to indicate QCL reference RS information for an NZP CSI-RS, a corresponding TCI state ID may be indicated in NZP CSI-RS resource configuration information. Furthermore, for example, in order to indicate QCL reference information for a PDCCH DMRS antenna port(s), a TCI state ID may be indicated in a CORESET configuration. Furthermore, for example, in order to indicate QCL reference information for a PDSCH DMRS antenna port(s), a TCI state ID may be indicated through DCI.

Quasi-Co Location (QCL)

An antenna port is defined so that a channel on which a symbol on an antenna port is carried is inferred from a channel on which another symbol on the same antenna port is carried. If the properties of a channel on which a symbol on one antenna port is carried can be derived from a channel on which a symbol on another antenna port is carried, the two antenna ports may be said to have a quasi co-located or quasi co-location (QC/QCL) relation.

In this case, the properties of the channel includes one or more of delay spread, Doppler spread, a frequency shift, average received power, received timing, and a spatial RX parameter. In this case, the spatial Rx parameter means a spatial (reception) channel property parameter, such as an angle of arrival.

In order to decode a PDSCH according to a detected PDCCH having intended DCI with respect to a corresponding UE and a given serving cell, a UE may be configured with a list of up to M TCI-State configurations within higher layer parameter PDSCH-Config. The M depends on a UE capability.

Each of the TCI-States includes a parameter for configuring a quasi co-location relation between one or two DL reference signals and the DM-RS port of a PDSCH.

The quasi co-location relation is configured as a higher layer parameter qcl-Type1 for a first DL RS and a higher layer parameter qcl-Type2 (if configured) for a second DL RS.

In the case of the two DL RSs, QCL types are not the same regardless of whether reference is the same DL RS or different DL RSs.

A quasi co-location type corresponding to each DL RS is given by a higher layer parameter qcl-Type of QCL-Info, and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and with a specific SSB from a QCL-Type D viewpoint. A UE configured with such an indication/configuration may receive a corresponding NZP CSI-RS by using Doppler, delay value measured in a QCL-TypeA TRS, and may apply, to the reception of the corresponding NZP CSI-RS, an Rx beam used for the reception of a QCL-TypeD SSB.

The UE receives an activation command used to map up to eight TCI states to the codepoint of a DCI field "Transmission Configuration Indication."

A coordinated multi-point transmission (CoMP) scheme has been introduced in the LTE system and partially introduced in NR Rel-15. The CoMP scheme includes various schemes, such as a same layer joint transmission scheme of transmitting the same signal or information from a plurality of transmission and reception points (TRPs), a point selection scheme of transmitting information of a certain moment a certain moment from a specific TRP in consideration of radio channel quality or traffic load occasions while a plurality of TRPs share information to be transmitted to a user equipment (UE), and/or an independent layer joint transmission scheme of spatial dimension multiplexing (SDM) and transmitting different signals or information from a plurality of TRPs to different spatial layers.

As a representative example of the point selection scheme, there is a dynamic point selection (DPS) scheme in which the TRP participating in the transmission is changeable each time physical downlink shared channel (PDSCH) is transmitted, and a term defined to inform that the PDSCH has been transmitted from which TRP is quasi-co-location (QCL). The QCL is that the base station indicates and/or configures, to the UE, whether the UE may assume that different antenna ports are same from a perspective of specific channel property (e.g., Doppler shift, Doppler spread, average delay, delay spread, and/or spatial RX parameter). For example, it is informed that when PDSCH is transmitted from TRP #1, a specific reference signal (RS) (e.g., CSI-RS resource #1), that has been transmitted from the TRP #1, and corresponding PDSCH demodulation reference signal (DMRS) antenna ports are QCLed, and it is informed that when PDSCH is transmitted from TRP #2, a specific RS (e.g., CSI-RS resource #2), that has been transmitted from the TRP #2, and corresponding PDSCH DMRS antenna ports are QCLed.

In order to indicate instantaneous QCL information via downlink control information (DCI), a PDSCH quasi-colocation information (PQI) field has been defined in LTE, and a transmission configuration information (TCI) field has been defined in NR.

The QCL indication and/or configuration method defined in the standard can be universally used in a joint transmission between a plurality of panels (antenna groups) of the same TRP, a joint transmission between a plurality of beams of the same TRP, etc. as well as a joint transmission between a plurality of TRPs. This is because, if the transmission panels or beams are different from each other even though the transmission is performed from the same TRP, Doppler, delay property, and/or reception beam (spatial Rx parameter), through which the signal transmitted from each panel and/or each beam goes, may be different.

In the next-generation wireless communication system, a scheme, in which a plurality of TRPs, panels, and/or beams transmit different layer groups to the UE, i.e., a scheme of standardization called an independent layer joint transmission (ILJT) scheme or a non-coherent joint transmission (NCJT) scheme has been discussed.

The contents (3GPP system, frame structure, NR system, etc.) described above may be combined and applied to methods proposed in the present disclosure to be described later, or may be supplemented to clarify technical features of the methods proposed in the present disclosure.

In the present disclosure, '/' refers to 'and', 'or', or 'and/or' according to the context.

When applying the ILJT (or NCJT) scheme, there are roughly two approaches. One approach is a multi-PDCCH based approach in which a plurality of TRPs, panels, and/or beams each transmit physical downlink control channel (PDCCH) and jointly transmit data to the UE, and the other approach is a single PDCCH based approach in which only one TRP, panel, and/or beam transmits the PDCCH, but a plurality of TRPs, panels, and/or beams participate in physical downlink shared channel (PDSCH) transmission and jointly transmit data to the UE.

When the present disclosure performs the ILJT scheme by applying the multi-PDCCH based approach, particularly, when (analog) beamforming is applied to the base station and/or UE (at a high frequency band), the present disclosure proposes methods of efficiently performing the multi-PDCCH based ILJT.

The UE may assume to apply the (analog) beamforming to downlink reception. In other words, the UE may receive a downlink signal using a specific beam of a plurality of candidate beams. Information that helps the UE to determine a PDSCH reception beam is information of RS (i.e., QCL source for Type D or spatial QCL information) that is QCLed from a perspective of the above-described spatial Rx parameter. If a plurality of PDSCH layer groups are transmitted to the UE and the respective PDSCH layer groups are transmitted from different TRPs, panels, and/or beams, optimal UE reception beams and/or panels to receive respective PDSCH layer groups may be different. There is a problem that this operation may be an operation that it is impossible for the specific UE to implement.

Because the NR system supports a method of dynamically indicating (spatial) QCL source of PDSCH via DCI of PDCCH (via setting tci-PresentInDCI=ON) and a method of following as it is a spatial Rx parameter of PDCCH scheduling the corresponding PDSCH (via setting tci-PresentInDCI=OFF), there is a need to define an ILJT operation according to each mode.

In addition, the UE requires time to change the beam according to spatial Rx parameter information of PDSCH indicated by the corresponding DCI after DCI decoding (this threshold is referred to as Threshold-Sched-Offset value). In order for the NR system to further give a faster scheduling support and a freedom of base station scheduler implementation, a method of scheduling the PDSCH at an earlier time point than the corresponding time threshold is also allowed.

When the PDSCH is allocated at an earlier time point than the threshold as described above, the UE uses a specified default (spatial) QCL parameter. In other words, the UE buffers the corresponding slot and then decodes DCI using the specified default (spatial) QCL parameter, and if a time domain location of the indicated PDSCH is earlier than the threshold, the UE receives the corresponding PDSCH through the signal that has been buffered. Default QCL information to be buffered by the UE is specified as 'CORESET associated with a monitored search space with the lowest CORESET-ID in the latest slot in which one or more CORESETs within the active BWP of the serving cell are monitored by the UE' in the current NR standard (hereinafter, may be referred to as default QCL information on the current NR standard). In other words, the default QCL information is specified as 'QCL reference signal (RS) information with respect to (specific) QCL parameter(s) of CORESET associated with a monitored search space with the lowest CORESET-ID in the latest slot in which one or more CORESETs within the active BWP of the serving cell are monitored by the UE'. For example, the (default) QCL information may contain a QCL source and a QCL type.

Hereinafter, although not strictly, the default QCL source defined in Rel-15 is described as 'transmission configuration indication (TCI) state of the lowest CORESET-ID' for convenience.

The multi-PDCCH based ILJT operation has a question of how to define the default QCL, and the present disclosure proposes various solutions to this question.

First, the UE may assume not to receive a signal with different Type D QCL sources (e.g., spatial QCL information) at the same time. This is the same assumption as when Rel-15 NR is designed. Hereinafter, in the present disclosure, the UE with the property may be expressed as 'having a basic UE capability'.

Implementationally, the corresponding UE may be a UE that can apply only one reception beam at a time (e.g., UE with a single Rx panel). If a multi-PDCCH based ILJT operation is applied to the corresponding UE, each PDCCH may have a feature transmitted and/or received from a non-overlapped symbol set between PDCCHs (e.g., via two TDMed CORESETs). In other words, the basic UE does expect to detect or receive two or more PDCCHs (with different (Type D) QCL sources) in a specific PDCCH symbol.

And/or, according to the UE implementation, there may be a UE that can simultaneously receive signals from two or more beams at one time point. In other words, the UE can receive signals with different Type D QCL sources at the same time. Hereinafter, in the present disclosure, the UE with the property may be expressed as 'having an enhanced UE capability'.

Implementationally, a UE equipped with a plurality of Rx panels may be assumed as an example of the UE with the property. The UE with the enhanced UE capability may be characterized in that a plurality of PDCCHs with different Type D QCL sources can be transmitted and/or received on the same symbol.

If the UE capability is subdivided, a capability of a UE capable of simultaneously receiving up to N PDCCHs (with different Type D QCL sources) may be defined.

The capability (e.g., whether the UE has the basic UE capability or the enhanced UE capability) is information that the UE reports to the base station and/or the network (upon the network/cell access), and the base station may control whether to overlap PDCCHs (with different Type D QCL sources) and/or the number of overlapped PDCCHs (with different Type D QCL sources) to the corresponding UE according to the above information.

The basic UE capability UE has a limitation that it shall receive all the PDSCH layers from the same beam. On the other hands, the enhanced UE capability UE can receive the PDSCH layers by applying each layer group to a different reception beam, and thus can apply relatively freely the ILJT. Thus, for the UE operating in the plurality of candidate (analog) beams, the ILJT operation may be applied only to the enhanced UE capability UE, and the basic UE capability UE may consider a method of limiting the application of the ILJT operation (e.g., the basic UE capability UE does not assume and/or expect different QCL sources for different layers of the same PDSCH).

In other words, in case of the basic UE capability UE (e.g., in case of not supporting two default TCIs/QCL assumptions), the base station may not expect, to the corresponding UE, PDCCH related configuration for the multi-PDCCH based ILJT (e.g., a plurality of CORESETs configured to the same bandwidth part (BWP) are configured to belong to a plurality of different CORESET groups (i.e., TRPs)).

However, only if only the reception beams for all the layer groups can be matched, the application of ILJT is possible to even the UE with the basic UE capability.

FIG. 18 illustrates an implementation of applying the ILJT to a basic UE. It may assume that respective PDCCHs and/or PDSCHs are transmitted from one TRP by applying different panels and/or beams. In this instance, PDSCH #1 and PDSCH #2 are partially or fully overlapped on at least time axis, and the UE may assume to perform the ILJT operation in overlapped symbol(s) (e.g., if rank2 transmission is per each PDSCH, 4 layers are received in overlapped symbols). It may be assumed that QCL source RSs transmitted from each panel and/or beam are CSI-RS resource (CRI) #1 and CSI-RS resource (CRI) #2, respectively. Optimal reception beams, that allow the UE to receive CRI #1 and CRI #2 may be different, but if CRI #1 and CRI #2 are transmitted in a similar beam direction, there may not be a big difference in performance even when the UE configures the (analog) reception beam according to one of CRI #1 and CRI #2. That is, the UE may apply and/or assume one common Type D QCL source for two PDSCHs.

Even in the case of basic UE, it is okay to assume a different QCL source for each PDSCH for Doppler shift, Doppler spread, average delay, and/or delay spread that are the QCL parameter other than the beam (i.e., spatial Rx parameter). That is, the UE may configure one reception beam through the assumption of the common type D QCL source to receive two PDSCHs. However, the UE may receive two PDSCHs by applying a value measured at CRI #1 and a value measured at CRI #2 to the delay and/or Doppler parameter in the demodulation of each PDSCH.

In other words, when the UE performs the PDSCH demodulation in a modem (at a digital end) while receiving all the layers from the same (RF or analog) beam, the UE may divide the layers into layer groups and apply a different long term channel parameter to each layer group to receive the demodulation. This is because if a signal is transmitted from different panels even though it is a signal transmitted, for example, from the same TRP, there may be a difference in the delay property by a line delay difference between the panels, and there may be a difference in the measured Doppler property since each panel may have a different RF property.

Hereinafter, the present disclosure proposes a method for performing a multi-PDCCH based ILJT operation for the basic UE capability UE (hereinafter, proposal 1), and a method for performing a multi-PDCCH based ILJT operation for the enhanced UE capability UE (hereinafter, proposal 2).

Embodiments of the present disclosure described below are distinguished merely by way of example for convenience of explanation, and it is a matter of course that partial method and/or configuration of any embodiment can be replaced by or combined and applied to partial method and/or configuration of another embodiment. For example, the UE may report, to the base station, whether the UE has the basic UE capability or the enhanced UE capability, and the UE may expect to operate in one method (e.g., proposal 1-1-3) of the proposal 1 and the proposal 2 described below according to the UE's capability.

For another example, the UE may report, to the base station, that the UE has the basic UE capability when performing a multi-PDCCH based JUT operation, and the UE may operate in a method of proposal 1-1-1 when setting tci-PresentInDCI=ON and then operate in a method of proposal 1-1-2 when setting tci-PresentInDCI=OFF.

For another example, when the UE simultaneously supports only one reception beam (when the UE does not support two default TCIs/QCL assumptions), the UE may not expect or assume PDSCH scheduling within a threshold. In other words, the UE may operate as in the proposal 1-1-1 or the proposal 1-1-2. When the base station receives, from the UE, UE capability information simultaneously supporting only one reception beam, the UE may not schedule the PDSCH within the threshold.

Proposal 1

First, for a basic UE capability UE, a method of performing a multi-PDCCH based JUT operation is described in detail.

The proposal 1 is described below, for the basic UE capability UE, by being divided into a method for when each PDCCH schedules a separate PDSCH, and/or time locations of PDSCHs are partially or fully overlapped (proposal 1-1), and a method for when a single PDSCH is jointly scheduled (proposal 1-2).

As an example of the proposal 1-2, a case where each PDCCH schedules a specific layer group of the PDSCH may be considered. As another example, a case where two PDCCHs (which are hierarchically designed) may transmit different information. In the later, a resource allocation (RA) field may exist only in DCI transmitted on one of the two PDCCHs.

Hereinafter, for convenience of description, a term of spatially QCL (sQCL) is frequently used, and this may have the same meaning as QCL with respect to spatial Rx parameter or QCL with respect to Type D QCL parameter.

Methods described below are divided merely by way of example for convenience of explanation, and it is a matter of course that configuration of any method can be replaced by or combined and applied to configuration of another method.

(Proposal 1-1)

First, for the basic UE capability UE, a method for when each PDCCH schedules a separate PDSCH, and/or time locations of PDSCHs are partially or fully overlapped is described.

In the proposal 1-1, frequency locations of the respective PDSCHs may be fully overlapped, partially overlapped, or non-overlapped.

The proposal 1-1 is described below by being divided into a case of setting tci-PresentInDCI=ON while the PDSCH is scheduled after a fixed time threshold compared to a PDCCH transmission time point in consideration of a time required for DCI decoding, a time required for a beam change, etc. (proposal 1-1-1), a case of setting tci-PresentInDCI=OFF while the PDSCH is scheduled after the fixed time threshold compared to the PDCCH transmission time point (proposal 1-1-2), and a case in which even one of all the PDSCHs is scheduled before the fixed time threshold (proposal 1-1-3). For example, the threshold may refer to a time or a minimum time required to apply spatial QCL information.

For example, when the UE simultaneously supports only one reception beam (when the UE does not support two default TCIs/QCL assumptions), the UE may not expect or assume PDSCH scheduling within the threshold. In other words, the UE may operate as in the proposal 1-1-1 or the proposal 1-1-2. When the base station receives, from the UE, UE capability information simultaneously supporting only one reception beam, the base station may not schedule the PDSCH within the threshold.

The threshold to be applied may be prescribed to (1) commonly apply the Threshold-Sched-Offset value defined and/or configured (for non-ILJT) in Rel-15 NR, or (2) be a scheduling offset value separately configured and/or prescribed for applying to a multi-PDCCH based ILJT case (e.g., when a plurality of overlapped PDSCHs is scheduled, or when a plurality of CORESET groups is configured, or when a plurality of CORESET groups is configured and PDCCHs (corresponding to specific RNTI and/or specific DCI format/type (e.g., DL grant)) are received from different CORESET groups (within a predetermined time or at the same time)), or (3) apply by adding or multiplying a specific value (prescribed, or configured and/or indicated by the base station) to or by the Threshold-Sched-Offset value defined and/or configured (for non-ILJT) in Rel-15 NR in the above case (e.g., 2× Threshold-Sched-Offset).

A reason to apply the way (2) or the way (3) is that when the UE performs particularly the serial processing, it may take more time for the UE to receive multi-PDCCH at a similar time point and then complete each DCI decoding than time it takes for the UE to receive a single PDCCH and then complete the DCI decoding. Which of the ways (1) to (3) is to be applied may vary depending on the (reported) capability of the UE, and the value or parameter set in the same way (e.g., the added or multiplied value in the way (3)) may vary depending on the capability of the UE.

(Proposal 1-1-1)

The proposal 1-1-1 may be applied when PDSCH TCI is indicated via DCI (i.e., the case of setting tci-PresentInDCI=ON) while all the PDSCHs are scheduled after the fixed time threshold.

One Type D QCL source information for the plurality of PDSCHs via one DCI of DCIs transmitted on the plurality of PDCCHs is transmitted to the UE. In this instance, QCL source information for QCL parameter(s) other than the spatial Rx parameter for each PDSCH may be transmitted by being included in DCI of the PDCCH transmitting scheduling information for each PDSCH.

For example, a TCI field may exist in each DCI transmitted on each PDCCH, and only the QCL source (e.g., Type A QCL source) for the remaining QCL parameters except the spatial Rx parameter may be indicated and/or configured in the remaining TCI(s) except one TCI (the UE does not expect that the Type D QCL source is configure and/or indicated to all the two TCI states).

For another example, a TCI field may exist in each DCI transmitted on each PDCCH, and all the respective TCIs may include Type D QCL source information. However, if two or more (different) Type D QCL source information is indicated to the UE, the UE may ignore Type D QCL source information indicated in TCIs of the remaining DCIs except one (specific) DCI.

For another example, the TCI exists in only one (specific) DCI among DCIs transmitted on the respective PDCCHs. That is, the UE does not expect to receive two or more TCIs to the plurality of DCIs scheduling the plurality of overlapped PDSCHs.

For another example, a TCI field may exist in each DCI transmitted on each PDCCH, and when the UE receives the plurality of TCIs, the UE ignores TCI information indicated in the TCIs of the remaining DCIs except one (specific) DCI.

In the above, the 'specific' DCI may be DCI transmitted on the PDCCH in which an end (or start) symbol location is later (or earlier), or DCI of the PDCCH received in CORESET with a higher (or lower) CORESET (group) ID.

And/or, in the proposal 1-1-1, (when the QCL source for the QCL parameter other than the spatial Rx parameter is different for each PDSCH,) the Type D QCL source may be limitedly applied only to a specific RS type (e.g., synchronization signal block (SSB)).

For example, as illustrated in FIG. 18, when there are (narrow beams) CSI-RS #1 and CSI-RS #2 that are sQCLed with (wide beam) SSB #1, PDSCH #1 allocated by PDCCH #1 may indicate CSI-RS #1 as the Type A QCL source and SSB #1 as the Type D QCL source, and PDSCH #2 allocated by PDCCH #2 may indicate CSI-RS #2 as the Type A QCL source and SSB #1 as the Type D QCL source. That is, a TCI in DCI1 on the PDCCH #1 may be indicated in the form of (CRI #1, SSB #1), and a TCI in DCI2 on the PDCCH #2 may be indicated in the form of (CRI #2, SSB #1) (TCI in DCI1 on the PDCCH #1=(CRI #1, SSB #1), and TCI in DCI2 on the PDCCH #2=(CRI #2, SSB #1)).

As described above, it can be more efficient that the Type D QCL sources for the plurality of PDSCHs are limited to SSB (which is a RS transmitted from a wider beam than CSI-RS).

Hence, the present disclosure can allow the UE to receive a plurality of PDSCHs transmitted from a plurality of base stations, TRPs, panels, and/or beams based on a plurality of PDCCHs without ambiguity of (single) reception (analog) beam configuration.

(Proposal 1-1-2)

The proposal 1-1-2 may be applied when PDSCH TCI is not indicated via DCI (i.e., the case of setting tci-PresentInDCI=OFF) while all the PDSCHs are scheduled after the fixed time threshold.

The UE assumes that a QCL source of each PDSCH is the same as a QCL source of a PDCCH (or the corresponding CORESET) scheduling each PDSCH. If Type D QCL sources of the respective PDCCHs are different from each other, (1) the UE chooses a Type D QCL source of a (specific) single PDCCH (or the corresponding CORESET) and assumes and/or applies it, or (2) the UE finds the same RS of RSs having a sQCL relationship with Type D QCL sources of the respective PDCCHs (or the corresponding CORESETs) and assumes and/or applies the corresponding RS as the Type D QCL sources of the corresponding PDSCHs.

The above proposal is a method in which the basic capability UE matches the reception beams when Type D QCL sources indicated by the corresponding TCIs are different, while maximally maintaining the existing method in which each PDSCH TCI follows a TCI of the PDCCH scheduling the corresponding PDSCH.

For example, in the above, the 'specific' single PDCCH may be a PDCCH in which an end (or start) symbol location is later (or earlier), or a PDCCH received in CORESET with a higher (or lower) CORESET (group) ID.

As an example of finding the same RS of RSs having a sQCL relationship with Type D QCL sources of the respective PDCCHs (or the corresponding CORESETs) and assuming and/or applying the corresponding RS as the Type D QCL sources of the corresponding PDSCHs, if CORESET1 TCI=(CSI-RS #x, CSI-RS #x) and CORESET2 TCI= (CSI-RS #y, CSI-RS #y), Type A QCL sources for PDSCH1 and PDSCH2 scheduled in PDCCH1 and PDCCH2 received in each CORESET respectively assume CSI-RS #x and CSI-RS #y, and when there is SSB #z spatially QCLed (by a chain rule) with both CSI-RS #x and CSI-RS #y for Type D QCL sources, SSB #z is assumed as a common Type D QCL source of all the two PDSCHs.

The chain rule means that the QCL source may also be found by a multi-step QCL relationship as in RS A→RS B→RS C (→: denotes a relationship of QCL source and target).

Hence, the present disclosure can allow the UE to receive a plurality of PDSCHs transmitted from a plurality of base stations, TRPs, panels, and/or beams based on a plurality of PDCCHs without ambiguity of (single) reception (analog) beam configuration.

(Proposal 1-1-3)

The proposal 1-1-3 may be applied when even one of all the PDSCHs is scheduled before the fixed time threshold.

If a specific PDSCH is allocated within the fixed time threshold, the UE assumes that (Type D) QCL sources (or spatial QCL information) of the corresponding PDSCH and other PDSCH(s) (with which resource is overlapped) are as a default (Type D) QCL source (in the same manner as the (Type D) QCL source of the specific PDSCH) (even if the corresponding PDSCH is allocated after the fixed time threshold).

The default QCL source (or default spatial QCL information) may be the same as a TCI (default QCL information on the current NR standard described above) corresponding to the lowest CORESET identify (ID) of the latest monitored CORESETs defined in the Rel-15 NR system. However, the corresponding default QCL source may be differently defined depending on a UE capability (see the proposal 2 below).

Hence, the present disclosure can allow the UE to receive a plurality of PDSCHs transmitted from a plurality of base stations, TRPs, panels, and/or beams based on a plurality of PDCCHs without ambiguity of (single) reception (analog) beam configuration.

(Proposal 1-2)

Next, for a basic UE capability UE, a method for when multiple PDCCHs jointly schedule a single PDSCH is described in detail.

In the proposal 1-2, information to be commonly applied to all layers of PDSCH and information to be applied per layer group of PDSCH may be dividedly transmitted to the UE.

For example, PDSCH layer common information may be transmitted to DCI of a specific PDCCH (e.g., using a specific DCI format), and information specified to a PDSCH layer group may be transmitted to DCI(s) of other PDCCH(s).

For another example, DCI of each PDCCH is information corresponding to each PDSCH layer group, and the PDSCH layer common information may be omitted in specific DCI(s) or may allow the UE operation to be defined in the form in which the UE ignores the corresponding information.

Examples of the layer common information may include a carrier and/or BWP indicator, VRB-PRB mapping, a PRB bundling size indicator, rate matching information, ZP CSI-RS trigger information, (part of) resource allocation information, and/or (part of) HARQ and/or PUCCH related information. Examples of the layer group specific information may include (part of) DMRS related information (e.g., antenna port, sequence initialization), MCS information, a new data indicator (NDI), (redundancy version), (part of) HARQ and/or PUCCH related information, and/or (part of) resource allocation information.

The proposal 1-2 is described below by being divided into a case of setting tci-PresentInDCI=ON while the PDSCH is scheduled after a fixed time threshold compared to a PDCCH transmission time point in consideration of a time required for DCI decoding, a time required for a beam change, etc. (proposal 1-2-1), a case of setting tci-PresentInDCI=OFF while the PDSCH is scheduled after the fixed time threshold compared to the PDCCH transmission time point (proposal 1-2-2), and a case in which even one of all the PDSCHs is scheduled before the fixed time threshold (proposal 1-2-3).

In this instance, it is more preferable that a criterion for whether or not to exceed the threshold is based on the last transmitted PDCCH of the plurality of PDCCHs participating in allocating the corresponding PDSCH. For example, the cases are divided depending on whether based on a PDCCH with the latest end symbol location among the plurality of PDCCHs, a start symbol transmission time point of the PDSCH compared to an end symbol transmission time point of the corresponding PDCCH exceeds the threshold.

The threshold to be applied may be prescribed to (1) commonly apply the Threshold-Sched-Offset value defined and/or configured (for non-ILJT) in Rel-15 NR, or (2) be a scheduling offset value separately configured and/or prescribed for applying to a multi-PDCCH based ILJT case (e.g., when a plurality of overlapped PDSCHs is scheduled, or when a plurality of CORESET groups is configured, or when a plurality of CORESET groups is configured and PDCCHs (corresponding to specific RNTI and/or specific DCI format/type (e.g., DL grant)) are received from different CORESET groups (within a predetermined time or at the same time)), or (3) apply by adding or multiplying a specific value (prescribed, or configured and/or indicated by the base station) to or by the Threshold-Sched-Offset value defined and/or configured (for non-ILJT) in Rel-15 NR in the above case (e.g., 2× Threshold-Sched-Offset).

A reason to apply the way (2) or the way (3) is that when the UE performs particularly the serial processing, it may take more time for the UE to receive multi-PDCCH at a similar time point and then complete each DCI decoding than time it takes for the UE to receive a single PDCCH and then complete the DCI decoding. Which of the ways (1) to (3) is to be applied may vary depending on the (reported) capability of the UE, and the value or parameter set in the same way (e.g., the added or multiplied value in the way (3)) may vary depending on the capability of the UE.

(Proposal 1-2-1)

The proposal 1-2-1 may be applied when PDSCH TCI is indicated via DCI (i.e., the case of setting tci-PresentInDCI=ON) while the PDSCH is scheduled after the fixed time threshold.

The UE acquires QCL source information depending on information (e.g., TCI) included in DCI(s). The UE acquires QCL source information for a spatial Rx parameter as layer common information (i.e., single information), and QCL source information for other QCL parameter(s) as layer group specific information (i.e., may be a plurality of information).

For example, type D QCL source information is indicated only in DCI (e.g., group-common DCI, 'specific DCI' in the examples of the proposal 1-1-1) transmitted on a specific PDCCH.

For another example, the UE ignores type D QCL source information indicated in the remaining DCI(s) except DCI (e.g., group-common DCI, 'specific DCI' in the examples of the proposal 1-1-1) transmitted on a specific PDCCH, and acquires type D QCL source information based on information indicated in the specific DCI.

For another example, the UE acquires (type D) QCL source information to be applied to each layer group via DCI and does not expect an occasion when Type D QCL source information is not matched.

For another example, the UE acquires (type D) QCL source information to be applied to each layer group via DCI, and when Type D QCL source information is not matched, the UE finds a common RS having a sQCL relationship (by a chain rule) with each Type D QCL source and assumes and/or configures the corresponding RS as the Type D QCL source.

In the proposal 1-2-1, (when the QCL source for the QCL parameter other than the spatial Rx parameter is different for each PDSCH,) the Type D QCL source may be limitedly applied only to a specific RS type (e.g., SSB). For example, as illustrated in FIG. 18, when there are (narrow beams) CSI-RS #1 and CSI-RS #2 that are sQCLed with (wide beam) SSB #1, it is more preferable that PDSCH layer group #1 indicates CSI-RS #1 as the Type A QCL source and SSB #1 as the Type D QCL source, and PDSCH layer group #2 indicates CSI-RS #2 as the Type A QCL source and SSB #1 as the Type D QCL source. That is, the Type D QCL source may be layer common and may be limited only to SSB.

Hence, the present disclosure can allow the UE to receive a single PDSCH transmitted from a plurality of base stations, TRPs, panels, and/or beams based on a plurality of PDCCHs without ambiguity of (single) reception (analog) beam configuration.

(Proposal 1-2-2)

The proposal 1-2-2 may be applied when PDSCH TCI is not indicated via DCI (i.e., the case of setting tci-PresentInDCI=OFF) while the PDSCH is scheduled after the fixed time threshold.

The UE assumes that a QCL source of each PDSCH layer group is the same as a QCL source of PDCCH (or corresponding CORESET) containing DCI transmitting corresponding PDSCH layer group specific information. If Type D QCL sources of the respective PDCCHs are different from each other, (1) the UE chooses a Type D QCL source of a (specific) single PDCCH (or the corresponding CORESET) and assumes and/or applies it, or (2) the UE finds the same RS of RSs having a sQCL relationship with Type D QCL sources of the respective PDCCHs (or the corresponding CORESETs) and assumes and/or applies the corresponding RS as the Type D QCL source of the PDSCH.

The above proposal is a method in which the (basic capability) UE can assume the Type D QCL source to be layer common while extending the existing method, in which the PDSCH TCI follows a TCI of the PDCCH scheduling the corresponding PDSCH, to a method for a plurality of PDCCHs in the ILJT scheme so that the QCL source can vary per PDSCH layer group.

In the above, the 'specific' single PDCCH may be a PDCCH in which an end (or start) symbol location is later (or earlier), or a PDCCH received in CORESET with a higher (or lower) CORESET (group) ID.

As an example of finding the same RS of RSs having a sQCL relationship with Type D QCL sources of each PDCCH (or the corresponding CORESET) and assuming and/or applying the corresponding RS as the Type D QCL source of the PDSCH, if CORESET1 TCI=(CSI-RS #x, CSI-RS #x) and CORESET2 TCI=(CSI-RS #y, CSI-RS #y), Type A QCL sources of the layer group #1 and the layer group #2 for PDSCH jointly scheduled in PDCCH1 and PDCCH2 received in each CORESET respectively assume CSI-RS #x and CSI-RS #y, and when there is SSB #z spatially QCLed (by a chain rule) with both CSI-RS #x and CSI-RS #y with respect to Type D QCL sources to be commonly applied to all the layer groups, SSB #z is assumed and/or configured as PDSCH layer common Type D QCL source.

Hence, the present disclosure can allow the UE to receive a single PDSCH transmitted from a plurality of base stations, TRPs, panels, and/or beams based on a plurality of PDCCHs without ambiguity of (single) reception (analog) beam configuration.

(Proposal 1-2-3)

The proposal 1-2-3 may be applied when PDSCH is scheduled before the fixed time threshold.

The UE assumes that a (Type D) QCL source for all the layer(s) of the corresponding PDSCH is a default (Type D) QCL source.

The default QCL source may be the same as a TCI (see default QCL information on the current NR standard described above) corresponding to the lowest CORESET ID of the latest monitored CORESETs defined in the Rel-15 NR system. However, the corresponding default QCL source may be differently defined depending on a UE capability (see the proposal 2).

For QCL parameter(s) other than the spatial Rx parameter, both a method of following a default QCL source (i.e., non-ILJT operation in this case) and a method of separately defining and/or configuring a default QCL source per each layer group in this case may be considered. In the later, for example, layer group1 may assume a QCL source of the lowest CORESET (group) ID as the default QCL source, and layer group2 may assume a QCL source of the second lowest CORESET (group) ID may be assumed as the default QCL source.

Hence, the present disclosure can allow the UE to receive a single PDSCH transmitted from a plurality of base stations, TRPs, panels, and/or beams based on a plurality of PDCCHs without ambiguity of (single) reception (analog) beam configuration.

An operation method for the enhanced UE that is receivable via two or more spatial Rx parameters at the same time (using a plurality of reception panels) is described below.

Proposal 2

Next, for an enhanced UE capability UE, a method of performing a multi-PDCCH based ILJT operation is described in detail.

The proposal 2 is described below, for the enhanced UE capability UE, by being divided into a method for when each PDCCH schedules a separate PDSCH, and/or time locations of PDSCHs are partially or fully overlapped (proposal 2-1), and a method for when a single PDSCH is jointly scheduled (proposal 2-2).

Methods described below are divided merely by way of example for convenience of explanation, and it is a matter of course that configuration of any method can be replaced by or combined and applied to configuration of another method.

(Proposal 2-1)

First, for the enhanced UE capability UE, a method for when each PDCCH schedules a separate PDSCH, and/or time locations of PDSCHs are partially or fully overlapped is described.

In the proposal 2-1, frequency locations of the respective PDSCHs may be fully overlapped, partially overlapped, or non-overlapped.

The proposal 2-1 is described below by being divided into a case of setting tci-PresentInDCI=ON while the PDSCH is scheduled after a fixed time threshold compared to a PDCCH transmission time point in consideration of a time required for DCI decoding, a time required for a beam change, etc. (proposal 2-1-1), a case of setting tci-PresentInDCI=OFF while the PDSCH is scheduled after the fixed time threshold compared to the PDCCH transmission time point (proposal 2-1-2), and a case in which even one of all the PDSCHs is scheduled before the fixed time threshold (proposal 2-1-3).

The threshold to be applied may be prescribed to (1) commonly apply the Threshold-Sched-Offset value defined and/or configured (for non-ILJT) in Rel-15 NR, or (2) be a scheduling offset value separately configured and/or prescribed for applying to a multi-PDCCH based ILJT case (e.g., when a plurality of overlapped PDSCHs is scheduled, or when a plurality of CORESET groups is configured, or when a plurality of CORESET groups is configured and PDCCHs (corresponding to specific RNTI and/or specific DCI format/type (e.g., DL grant)) are received from different CORESET groups (within a predetermined time or at the same time)), or (3) apply by adding or multiplying a specific value (prescribed, or configured and/or indicated by the base station) to or by the Threshold-Sched-Offset value defined and/or configured (for non-ILJT) in Rel-15 NR in the above case (e.g., 2× Threshold-Sched-Offset).

A reason to apply the way (2) or the way (3) is that when the UE performs particularly the serial processing, it may take more time for the UE to receive multi-PDCCH at a similar time point and then complete each DCI decoding than time it takes for the UE to receive a single PDCCH and then complete the DCI decoding. Which of the ways (1) to (3) is to be applied may vary depending on the (reported) capability of the UE, and the value or parameter set in the same way (e.g., the added or multiplied value in the way (3)) may vary depending on the capability of the UE.

(Proposal 2-1-1)

The proposal 2-1-1 may be applied when PDSCH TCI is indicated via DCI (i.e., the case of setting tci-PresentInDCI=ON) while all the PDSCHs are scheduled after the fixed time threshold.

The UE acquires QCL source information of each PDSCH from DCI of PDCCH scheduling the corresponding PDSCH.

In addition, when X or more different sQCL source information is indicated to the UE that can simultaneously receive signals and/or channels with up to X different sQCL sources, the UE may select only X DCIs by a specific (prioritization) rule to acquire the corresponding sQCL information and ignore the remaining sQCL source information.

Hence, the present disclosure can allow the UE to receive a plurality of PDSCHs transmitted from a plurality of base stations, TRPs, panels, and/or beams based on a plurality of PDCCHs without ambiguity of reception (analog) beam configuration (for each reception panel).

(Proposal 2-1-2)

The proposal 2-1-2 may be applied when PDSCH TCI is not indicated via DCI (i.e., the case of setting tci-PresentInDCI=OFF) while all the PDSCHs are scheduled after the fixed time threshold.

The UE assumes that a QCL source of each PDCCH (CORESET) corresponds to a QCL source of PDSCH scheduled by the corresponding PDCCH.

In addition, when X or more different sQCL source information is indicated to the UE that can simultaneously receive signals and/or channels with up to X different sQCL sources, the UE may select only X PDCCHs (or CORESETs) by a specific (prioritization) rule to acquire the corresponding sQCL information and ignore the remaining sQCL source information.

Hence, the present disclosure can allow the UE to receive a plurality of PDSCHs transmitted from a plurality of base stations, TRPs, panels, and/or beams based on a plurality of PDCCHs without ambiguity of reception (analog) beam configuration (for each reception panel).

(Proposal 2-1-3)

The proposal 2-1-3 may be applied when even one of all the PDSCHs is scheduled before the fixed time threshold.

When a specific PDSCH is scheduled before the fixed time threshold, the UE applies and/or assumes a default TCI upon the reception of the corresponding PDSCH. In this instance, a plurality of default TCIs may be defined and/or configured for the enhanced UE (according to the UE reception panel and/or the number of beams), and which of the plurality of default TCIs is to be applied may be prescribed and/or configured per CORESET.

(At least) one of the plurality of default TCIs may mean a TCI (default QCL information on the current NR standard described above) corresponding to the lowest CORESET ID of the latest monitored CORESETs defined in the Rel-15 NR system.

For example, when the default TCI is prescribed and/or configured as in CORESET1→lowest CORESET ID and CORESET2→second lowest CORESET ID, the UE performs buffering on one reception beam and/or panel according to Type D QCL source indicated by a TCI of the lowest CORESET ID; performs buffering on another one reception beam and/or panel according to Type D QCL source indicated by a TCI of the second lowest CORESET ID; demodulates PDSCH1 through the reception signal that has been buffered via the TCI of the lowest CORESET ID if a PDSCH scheduled in the CORESET1 is allocated within a threshold (which is time required for beam switching after DCI decoding); and demodulates PDSCH2 through the reception signal that has been buffered via the TCI of the second lowest CORESET ID if a PDSCH scheduled in the CORESET2 is allocated within the threshold (which is time required for beam switching after DCI decoding).

In addition to the above method, in the proposal 2-1-3, a single default TCI may be prescribed and/or configured for all the PDSCHs, in order to perform the non-ILJT operation.

Hence, the present disclosure can allow the UE to receive a plurality of PDSCHs transmitted from a plurality of base stations, TRPs, panels, and/or beams based on a plurality of PDCCHs without ambiguity of reception (analog) beam configuration (for each reception panel).

(Proposal 2-2)

Next, for the enhanced UE capability UE, a method for when multiple PDCCHs jointly schedule a single PDSCH is described in detail.

In the proposal 2-2, information to be commonly applied to all layers of PDSCH and information to be applied per layer group of PDSCH may be dividedly transmitted to the UE.

For example, PDSCH layer common information may be transmitted to DCI of a specific PDCCH (e.g., using a specific DCI format), and information specified to a PDSCH layer group may be transmitted to DCI(s) of other PDCCH(s).

For another example, DCI of each PDCCH is information corresponding to each PDSCH layer group, and the PDSCH layer common information may be omitted in specific DCI(s) or may allow the UE operation to be defined in the form in which the UE ignores the corresponding information. Examples of the layer common information may include a carrier and/or BWP indicator, VRB-PRB mapping, a PRB bundling size indicator, rate matching information, ZP CSI-RS trigger information, (part of) resource allocation information, and/or (part of) HARQ and/or PUCCH related information. Examples of the layer group specific information may include (part of) DMRS related information (e.g., antenna port, sequence initialization), MCS information, a new data indicator (NDI), a redundancy version (RV), (part of) HARQ and/or PUCCH related information, and/or (part of) resource allocation information.

The proposal 2-2 is described below by being divided into a case of setting tci-PresentInDCI=ON while the PDSCH is scheduled after a fixed time threshold compared to a PDCCH transmission time point in consideration of a time required for DCI decoding, a time required for a beam change, etc. (proposal 2-2-1), a case of setting tci-PresentInDCI=OFF while the PDSCH is scheduled after the fixed time threshold compared to the PDCCH transmission time point (proposal 2-2-2), and a case in which even one of all the PDSCHs is scheduled before the fixed time threshold (proposal 2-2-3).

In this instance, it is more preferable that a criterion for whether or not to exceed the threshold is based on the last transmitted PDCCH of the plurality of PDCCHs participating in allocating the corresponding PDSCH. For example, the cases are divided depending on whether or not based on a PDCCH with the latest end symbol location among the plurality of PDCCHs, a start symbol transmission time point of the PDSCH compared to an end symbol transmission time point of the corresponding PDCCH exceeds the threshold. The threshold to be applied may be prescribed to (1) commonly apply the Threshold-Sched-Offset value defined and/or configured (for non-ILJT) in Rel-15 NR, or (2) be a scheduling offset value separately configured and/or prescribed for applying to a multi-PDCCH based ILJT case (e.g., when a plurality of overlapped PDSCHs is scheduled, or when a plurality of CORESET groups is configured, or when a plurality of CORESET groups is configured and PDCCHs (corresponding to specific RNTI and/or specific DCI format/type (e.g., DL grant)) are received from different CORESET groups (within a predetermined time or at the same time)), or (3) apply by adding or multiplying a specific value (prescribed, or configured and/or indicated by the base station) to or by the Threshold-Sched-Offset value defined and/or configured (for non-ILJT) in Rel-15 NR in the above case (e.g., 2× Threshold-Sched-Offset).

A reason to apply the way (2) or the way (3) is that when the UE performs particularly the serial processing, it may take more time for the UE to receive multi-PDCCH at a similar time point and then complete each DCI decoding than time it takes for the UE to receive a single PDCCH and then complete the DCI decoding. Which of the ways (1) to (3) is to be applied may vary depending on the (reported) capability of the UE, and the value or parameter set in the same way (e.g., the added or multiplied value in the way (3)) may vary depending on the capability of the UE.

(Proposal 2-2-1)

The proposal 2-2-1 may be applied when PDSCH TCI is indicated via DCI (i.e., the case of setting tci-PresentInDCI=ON) while the PDSCH is scheduled after the fixed time threshold.

The UE acquires QCL source information to apply to each layer group from a single or multiple DCI(s).

As an example of DCI configuration, a specific TCI state may indicate QCL source information to apply to each of a plurality of layer groups (e.g., a TCI state 4 (Type A QCL source for layer group #1, Type A QCL source for layer group #2, Type D QCL source for layer group #1, and Type D QCL source for layer group #2)).

As another example of DCI configuration, a plurality of TCI states may be indicated to the UE via a plurality of DCIs, and each TCI state may indicate QCL source information to apply to a specific layer group (e.g., a TCI state from DCI #1→(Type A QCL source for layer group #1, Type D QCL source for layer group #1), and a TCI state from DCI #2→(Type A QCL source for layer group #2, Type D QCL source for layer group #2)).

In addition, when X or more different sQCL source information is indicated to the UE that can simultaneously receive signals and/or channels with up to X different sQCL sources, the UE may select only X DCIs by a specific (prioritization) rule to acquire the corresponding sQCL information and ignore the remaining sQCL source information.

Hence, the present disclosure can allow the UE to receive a single PDSCH transmitted from a plurality of base stations, TRPs, panels, and/or beams based on a plurality of PDCCHs without ambiguity of reception (analog) beam configuration (for each reception panel).

(Proposal 2-2-2)

The proposal 2-2-2 may be applied when PDSCH TCI is not indicated via DCI (i.e., the case of setting tci-PresentInDCI=OFF) while the PDSCH is scheduled after the fixed time threshold.

The UE assumes that a QCL source of each PDSCH layer group is the same as a QCL source of the PDCCH (or the corresponding CORESET) containing DCI transmitting the corresponding PDSCH layer group specific information.

The above proposal is a method of extending the existing method, in which the PDSCH TCI follows a TCI of the PDCCH scheduling the corresponding PDSCH, to a method for a plurality of PDCCHs in the ILJT scheme so that the QCL source can vary per PDSCH layer group.

In addition, when X or more different sQCL source information is indicated to the UE that can simultaneously receive signals and/or channels with up to X different sQCL sources, the UE may select only X PDCCHs (or CORESETs) by a specific (prioritization) rule to acquire the corresponding sQCL information and ignore the remaining sQCL source information.

Hence, the present disclosure can allow the UE to receive a single PDSCH transmitted from a plurality of base stations, TRPs, panels, and/or beams based on a plurality of PDCCHs without ambiguity of reception (analog) beam configuration (for each reception panel).

(Proposal 2-2-3)

The proposal 2-2-3 may be applied when the PDSCH is scheduled before the fixed time threshold.

The proposal 2-2-3 applies and/or assumes a default TCI upon the reception of the corresponding PDSCH. In this instance, a default TCI to apply for each layer group may be separately defined and/or configured for the enhanced UE (according to the UE reception panel/the number of beams).

(At least) one of the plurality of default TCIs may mean a TCI (default QCL information on the current NR standard described above) corresponding to the lowest CORESET ID of the latest monitored CORESETs defined in the Rel-15 NR system.

For example, the proposal may prescribe and/or configure a default TCI per CORESET, and then may apply the prescribed and/or configured default DCI to the corresponding CORESET upon the reception of the corresponding layer group depending on the CORESET location at which PDCCH containing layer group specific information is received.

In addition to the above method, in the proposal 2-2-3, a single default TCI may be prescribed and/or configured for all the layers, in order to perform the non-ILJT operation.

Hence, the present disclosure can allow the UE to receive a single PDSCH transmitted from a plurality of base stations, TRPs, panels, and/or beams based on a plurality of PDCCHs without ambiguity of reception (analog) beam configuration (for each reception panel).

When applying the proposed methods, the UE and the base station may perform the following operation procedures.

Step 1: DL/UL Beam Management Procedure

This step is a process of matching a DL transmission (Tx)-reception (Rx) beam pair and an UL Tx-Rx beam pair between a base station and a UE (see "beam management" for a detailed description).

The present disclosure assumes that a plurality of base stations, TRPs, and/or panels may participate in this procedure (e.g., matching best beam pair(s) between each TRP and the corresponding UE).

Step 2: DL CSI Acquisition Procedure

This step is a procedure in which if (based on the matched beam pair in the step1) the base station transmits CSI-RS to specific (serving) DL beam pair(s), the UE performs the CSI reporting (see "CSI related procedure" for a detailed description).

The present disclosure assumes that the plurality of base stations, TRPs, and/or panels may participate in this procedure (e.g., each performing CSI acquisition for a best beam pair between each TRP and the corresponding UE).

Step 3: PDCCH Transmission and Reception Procedure for PDSCH Assignment

This step is a procedure in which if (based on CSI information acquired by (each) base station in the step2) the base station transmits, to the UE, DL DCI containing PDSCH transmission resource location and MCS, antenna port information, HARQ related information, etc.

The present disclosure assumes that the plurality of base stations, TRPs, panels and/or beams participate in this procedure and transmit a plurality of PDCCHs to the UE (e.g., transmitting one PDCCH per base station, TRP, panel, and/or beam).

The proposals 1-1 and 2-1 assume that each PDCCH assigns a separate PDSCH. In this instance, it is assumed that a symbol location at which each PDSCH is transmitted is (partially or fully) overlapped. The proposals 1-2 and 2-2 assume that the plurality of PDCCHs (jointly) assign a signal PDSCH.

Step 4: PDSCH Transmission and Reception Procedure

This step is a procedure in which if the base station transmits the PDSCH depending on PDSCH assignment information in the DL DCI transmitted and received in the Step3, the UE receives it.

The present disclosure assumes that the plurality of PDSCHs may be transmitted to the UE in the proposals 1-1 and 2-1, and (a set of) the base station, TRP, panel, and/or beam participating in each PDSCH transmission may be different from each other.

However, the present disclosure assumes that the proposal 1-1 may be limitedly applied when the (analog) beams participating in transmission for all the PDSCHs are the same or have a similar beam direction (in the case of RS with the same sQCLed source).

The examples of the proposal 1-1 have proposed the operation of the base station and/or the UE depending on whether or not time locations of the assigned PDSCHs are within a specific time threshold compared to the PDCCH and whether or not TCI information of the PDSCH is indicated via DCI.

However, the present disclosure assumes that the (analog) beams participating in transmission for all the PDSCHs in the proposal 2-1 may be different.

The examples of the proposal 2-1 have proposed the operation of the base station and/or the UE depending on whether or not a time location of the assigned PDSCH is within a specific time threshold compared to the PDCCH and whether or not TCI information of the PDSCH is indicated via DCI.

In the present disclosure, the proposals 1-2 and 2-2 assume that a single PDSCH is transmitted to the UE, and (a set of) the base station, TRP, panel, and/or beam participating in transmission per layer group for a plurality of layers constituting the PDSCH may be different from each other.

However, the present disclosure assumes that the proposal 1-2 may be limitedly applied when the (analog) beams participating in transmission for all the layer groups are the same or have a similar beam direction (in the case of RS with the same sQCLed source).

The examples of the proposal 1-2 has proposed the operation of the base station and/or the UE depending on whether or not time locations of the assigned PDSCHs are within a specific time threshold compared to the PDCCH and whether or not TCI information of the PDSCH is indicated via DCI.

However, the present disclosure assumes that the (analog) beams participating in transmission for all the layer groups in the proposal 2-2 may be different.

The examples of the proposal 2-2 have proposed the operation of the base station and/or the UE depending on whether or not a time location of the assigned PDSCH is within a specific time threshold compared to the PDCCH and whether or not TCI information of the PDSCH is indicated via DCI.

Step 5: HARQ Procedure

This step is a procedure of determining whether a reception for the PDSCH received in the Step 4 succeeds or fails to configure ACK information if the reception succeeds (on a per CBG, codeword, and/or TB basis) or configure NACK information if the reception fails, and then sending the corresponding information to the base station on the assigned PUSCH resources via PUCCH resources designated in the Step 3 or a separate procedure.

The methods proposed in the present disclosure may affect only the Step 3 and the Step 4 on the standard document. In other words, the Step 1, the Step 2, and/or the Step 5 may be implemented using the existing standard technology, and the order performing the corresponding procedures may also be implementationally changed (e.g., performing the Step 2 and then performing the Step 1 for the beam re-adjustment).

FIG. 19 is a flow chart illustrating an operation method of a UE described in the present disclosure.

Referring to FIG. 19, first, a UE (1000/2000 of FIGS. 21 to 25) may transmit, to a base station, UE capability information representing the number of simultaneously supportable beams, in S1901.

For example, an operation for the UE of the step S1901 to transmit the UE capability information may be implemented by devices of FIGS. 21 to 25 to be described below. For example, referring to FIG. 22, one or more processors 1020 may control one or more memories 1040 and/or one or more RF units 1060, etc. in order to transmit the UE capability information, and one or more RF units 1060 may transmit the UE capability information.

Next, the UE (1000/2000 of FIGS. 21 to 25) may receive, from the base station, independent layer joint transmission (ILJT)-related configuration information, in S1902.

For example, an operation for the UE of the step S1902 to receive the ILJT-related configuration information may be implemented by the devices of FIGS. 21 to 25 to be described below. For example, referring to FIG. 22, one or more processors 1020 may control one or more memories 1040 and/or one or more RF units 1060, etc. in order to receive the ILJT-related configuration information, and one or more RF units 1060 may receive the ILJT-related configuration information.

Next, the UE (1000/2000 of FIGS. 21 to 25) may receive a plurality of PDCCHs from the base station based on the ILJT-related configuration information, in S1903.

For example, the ILJT-related configuration information may include at least one of information for the plurality of PDCCHs scheduling a plurality of physical downlink shared channels (PDSCHs) that are overlapped, and/or information for a control resource set (CORESET). For example, the control resource set may be a resource domain in which the UE can expect a reception of the PDCCH.

The control resource set may be configured based on at least one index (e.g., CORESETPoolIndex) representing a group of a control resource set. And/or, the number of at least one index may be based on the UE capability information. The control resource set may refer to one or more resource sets.

For example, when the UE does not simultaneously support a plurality of beams, a control resource set may be configured based on one index. In other words, when the UE does not simultaneously support the plurality of beams, only one or more control resource sets with the same index may be configured in a specific bandwidth part. In this instance, the plurality of PDCCHs transmitted in the control resource set may be transmitted from the same transmission and reception end, panel, or beam.

And/or, when the UE simultaneously supports two beams, the control resource set may be configured based on two indexes. In other words, when the UE simultaneously supports two beams, one or more control resource sets configured in a specific bandwidth part may be configured with different indexes. In this instance, a first PDCCH of a control resource set with a first index may be transmitted from a different transmission and reception end, panel, or beam from a second PDCCH of a control resource set with a second index. And/or, the first PDCCH may be received based on different QCL information (or QCL source) for spatial parameter from the second PDCCH.

For example, an operation for the UE of the step S1903 to receive the plurality of PDCCHs may be implemented by the devices of FIGS. 21 to 25 to be described below. For example, referring to FIG. 22, one or more processors 1020 may control one or more memories 1040 and/or one or more RF units 1060, etc. in order to receive the plurality of PDCCHs, and one or more RF units 1060 may receive the plurality of PDCCHs.

Next, the UE (1000/2000 of FIGS. 21 to 25) may receive a plurality of physical downlink shared channels (PDSCHs) from the base station based on the plurality of PDCCHs. The plurality of PDCCHs may schedule different PDSCHs.

For example, an operation for the UE to receive the plurality of PDSCHs may be implemented by the devices of FIGS. 21 to 25 to be described below. For example, referring to FIG. 22, one or more processors 1020 may control one or more memories 1040 and/or one or more RF units 1060, etc. in order to receive the plurality of PDSCHs, and one or more RF units 1060 may receive the plurality of PDSCHs. And/or, the plurality of PDCCHs may schedule different PDSCHs.

Since the operation of the UE described with reference to FIG. 19 is the same as the operation of the UE described with reference to FIGS. 1 to 18 (e.g., the proposals 1 and 2), a further description thereof is omitted.

The signalling and the operation described above may be implemented by devices to be described below (e.g., see FIGS. 21 to 25). For example, the signalling and the operation described above may be processed by one or more processors 1010 and 2020 of FIGS. 21 to 25, and may be stored in a memory (e.g., 1040 and 2040) in the form of command/program (e.g., instruction, executable code) for executing at least one processor (e.g., 1010 and 2020) of FIGS. 21 to 25.

For example, in a device including one or more memories and one or more processors functionally connected to the one or more memories, the one or more processors may be configured to allow the device to transmit, to a base station, UE capability information representing the number of simultaneously supportable beams, receive independent layer joint transmission (ILJT)-related configuration information from the base station, and receive a plurality of PDCCHs from the base station based on the ILJT-related configuration information, wherein the ILJT-related configuration information may be determined based on the UE capability information.

For another example, in a non-temporary computer readable medium (CRM) storing one or more commands, one or more commands that are executable by one or more processors may allow the UE to transmit, to a base station, UE capability information representing the number of simultaneously supportable beams, receive independent layer joint transmission (ILJT)-related configuration information from the base station, and receive a plurality of PDCCHs from the base station based on the ILJT-related configuration information, wherein the ILJT-related configuration information may be determined based on the UE capability information.

FIG. 20 is a flow chart illustrating an operation method of a base station described in the present disclosure.

Referring to FIG. 20, first, a base station (1000/2000 of FIGS. 21 to 25) may receive, from a UE, UE capability information representing the number of simultaneously supportable beams, in S2001.

For example, an operation for the base station of the step S2001 to receive the UE capability information may be implemented by devices of FIGS. 21 to 25 to be described below. For example, referring to FIG. 22, one or more processors 1020 may control one or more memories 1040 and/or one or more RF units 1060, etc. in order to receive the UE capability information, and one or more RF units 1060 may receive the UE capability information.

Next, the base station (1000/2000 of FIGS. 21 to 25) may transmit, to the UE, independent layer joint transmission (ILJT)-related configuration information, in S2002.

For example, an operation for the base station of the step S2002 to transmit the ILJT-related configuration information may be implemented by the devices of FIGS. 21 to 25 to be described below. For example, referring to FIG. 22, one or more processors 1020 may control one or more memories 1040 and/or one or more RF units 1060, etc. in order to transmit the ILJT-related configuration information, and one or more RF units 1060 may transmit the ILJT-related configuration information.

Next, the base station (1000/2000 of FIGS. 21 to 25) may transmit a plurality of PDCCHs to the UE based on the ILJT-related configuration information, in S2003.

For example, the ILJT-related configuration information may include at least one of information for the plurality of PDCCHs scheduling a plurality of physical downlink shared channels (PDSCHs) that are overlapped, and/or information for a control resource set (CORESET). For example, the control resource set may be a resource domain in which the UE can expect a reception of the PDCCH.

The control resource set may be configured based on at least one index (e.g., CORESETPoolIndex) representing a group of a control resource set. And/or, the number of at least one index may be based on the UE capability information. The control resource set may refer to one or more resource sets.

For example, when the UE does not simultaneously support a plurality of beams, a control resource set may be configured based on one index. In other words, when the UE does not simultaneously support the plurality of beams, only one or more control resource sets with the same index may be configured in a specific bandwidth part. In this instance, the plurality of PDCCHs transmitted in the control resource set may be transmitted from the same transmission and reception end, panel, or beam.

And/or, when the UE simultaneously supports two beams, the control resource set may be configured based on two indexes. In other words, when the UE simultaneously supports two beams, one or more control resource sets configured in a specific bandwidth part may be configured with different indexes. In this instance, a first PDCCH of a control resource set with a first index may be transmitted from a different transmission and reception end, panel, or beam from a second PDCCH of a control resource set with a second index. And/or, the first PDCCH may be received based on different QCL information (or QCL source) for spatial parameter from the second PDCCH.

For example, an operation for the base station of the step S2003 to transmit the plurality of PDCCHs may be implemented by the devices of FIGS. 21 to 25 to be described below. For example, referring to FIG. 22, one or more processors 1020 may control one or more memories 1040 and/or one or more RF units 1060, etc. in order to transmit the plurality of PDCCHs, and one or more RF units 1060 may transmit the plurality of PDCCHs.

Next, the base station (1000/2000 of FIGS. 21 to 25) may transmit a plurality of physical downlink shared channels (PDSCHs) to the UE based on the plurality of PDCCHs. The plurality of PDCCHs may schedule different PDSCHs.

For example, an operation for the base station to transmit the plurality of PDSCHs may be implemented by the devices of FIGS. 21 to 25 to be described below. For example, referring to FIG. 22, one or more processors 1020 may control one or more memories 1040 and/or one or more RF units 1060, etc. in order to transmit the plurality of PDSCHs, and one or more RF units 1060 may transmit the plurality of PDSCHs. And/or, the plurality of PDCCHs may schedule different PDSCHs.

Since the operation of the base station described with reference to FIG. 20 is the same as the operation of the base station described with reference to FIGS. 1 to 19 (e.g., the proposals 1 and 2), a further description thereof is omitted.

The signalling and the operation described above may be implemented by devices to be described below (e.g., see FIGS. 21 to 25). For example, the signalling and the operation described above may be processed by one or more processors 1010 and 2020 of FIGS. 21 to 25, and may be stored in a memory (e.g., 1040 and 2040) in the form of command/program (e.g., instruction, executable code) for executing at least one processor (e.g., 1010 and 2020) of FIGS. 21 to 25.

For example, in a device including one or more memories and one or more processors functionally connected to the one or more memories, the one or more processors may be configured to allow the device to receive, from a UE, UE capability information representing the number of simultaneously supportable beams, transmit independent layer joint transmission (ILJT)-related configuration information to the UE, and transmit a plurality of PDCCHs to the UE based on the ILJT-related configuration information, wherein the ILJT-related configuration information may be determined based on the UE capability information.

For another example, in a non-temporary computer readable medium (CRM) storing one or more commands, one or more commands that are executable by one or more processors may allow the base station to receive, from a UE, UE capability information representing the number of simultaneously supportable beams, transmit independent layer joint transmission (ILJT)-related configuration information to the UE, and transmit a plurality of PDCCHs to the UE based on the ILJT-related configuration information, wherein the ILJT-related configuration information may be determined based on the UE capability information.

Example of Communication System to which the Present Disclosure is Applied

Although not limited thereto, but various descriptions, functions, procedures, proposals, methods, and/or operation flowcharts described in the present disclosure can be applied to various fields requiring wireless communication/connection (e.g., 5G) between devices.

Hereinafter, the communication system will be described in more detail with reference to drawings. In the following drawings/descriptions, the same reference numerals will refer to the same or corresponding hardware blocks, software blocks, or functional blocks, if not differently described.

FIG. 21 illustrates a communication system 10 applied to the present disclosure.

Referring to 21, a communication system 10 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 1000a, vehicles 1000b-1 and 1000b-2, an eXtended Reality (XR) device 1000c, a hand-held device 1000d, a home appliance 1000e, an Internet of Thing (IoT) device 1000f, and an AI device/server 4000. For example, the vehicle may include a vehicle with a wireless communication function, an autonomous vehicle, a vehicle capable of performing inter-vehicle communication, and the like. Further, the vehicle may include an unmanned aerial vehicle (UAV) (e.g., drone). The XR device may include an augmented reality (AR)/virtual reality (VR)/mixed reality (MR) device and may be implemented as a head-mounted device (HMD), a head-up display (HUD) provided in the vehicle, a television, a smart phone, a computer, a wearable device, a home appliance device, digital signage, a vehicle, a robot, etc. The hand-held device may include a smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even as the wireless device, and a specific wireless device 2000a may operate as a base station/network node for other wireless devices.

The wireless devices 1000a to 1000f may be connected to a network 3000 over a base station 2000. An artificial intelligence (AI) technology may be applied to the wireless devices 1000a to 1000f, and the wireless devices 1000a to 1000f may be connected to the AI server 4000 over the network 3000. The network 3000 may be comprised using a 3G network, a 4G (e.g., LTE) network, or a 5G (e.g., NR) network. The wireless devices 1000a to 1000f may communicate with each other over the base station 2000/network 3000, but may directly communicate with each other without going through the base station/network (sidelink communication). For example, the vehicles 1000b-1 and 1000b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 1000a to 1000f.

Wireless communications/connections 1500a, 1500b, and 1500c may be made between the wireless devices 1000a to 1000f and the base station 2000 and between the base station 2000 and the base station 2000. The wireless communication/connection may be made through various wireless access technologies (e.g., 5G NR) such as uplink/downlink communication 1500a, sidelink communication 1500b (or D2D communication), and inter-base station communication 1500c (e.g., relay, integrated access backhaul (IAB)). The wireless device and the base station/the wireless device and the base station and the base station may transmit/receive radio signals to/from each other through wireless communications/connections 1500a, 1500b, and 1500c. For example, the wireless communications/connections 1500a, 1500b, and 1500c may transmit/receive signals on various physical channels. To this end, based on various descriptions of the present disclosure, at least some of various configuration information setting processes, various signal processing processes (e.g., channel encoding/decoding, modulation/demodulation, resource mapping/de-mapping, etc.), a resource allocation process, etc. for transmission/reception of the radio signal may be performed.

Example of Wireless Device to which the Present Disclosure is Applied

FIG. 22 illustrates a wireless device applicable to the present disclosure.

Referring to FIG. 22, a first wireless device 1000 and a second wireless device 2000 may transmit and receive radio signals through various wireless access technologies (e.g., LTE and NR). The first wireless device 1000 and the second wireless device 2000 may correspond to the wireless device 1000x and the base station 2000 and/or the wireless device 1000x and the wireless device 1000x of FIG. 21.

The first wireless device 1000 may include one or more processors 1020 and one or more memories 1040 and may further include one or more transceivers 1060 and/or one or more antennas 1080. The processor 1020 may control the memory 1040 and/or the transceiver 1060 and may be configured to implement descriptions, functions, procedures, proposals, methods, and/or operation flows described in the present disclosure. For example, the processor 1020 may process information in the memory 1040 and generate first information/signal and then transmit a radio signal including the first information/signal through the transceiver 1060. Further, the processor 1020 may receive a radio signal including second information/signal through the transceiver 1060 and then store in the memory 1040 information obtained from signal processing of the second information/signal. The memory 1040 may be connected to the processor 1020 and store various information related to an operation of the processor 1020. For example, the memory 1040 may store a software code including instructions for performing some or all of processes controlled by the processor 1020 or performing the descriptions, functions, procedures, proposals, methods, and/or operation flowcharts described in the present disclosure. The processor 1020 and the memory 1040 may be a part of a communication modem/circuit/chip designed to implement the wireless communication technology (e.g., LTE and NR). The transceiver 1060 may be connected to the processor 1020 and may transmit and/or receive the radio signals through one or more antennas 1080. The transceiver 1060 may include a transmitter and/or a receiver. The transceiver 1060 may be mixed with a radio frequency (RF) unit. In the present disclosure, the wireless device may mean the communication modem/circuit/chip.

The second wireless device 2000 may include one or more processors 2020 and one or more memories 2040 and may further include one or more transceivers 2060 and/or one or more antennas 2080. The processor 2020 may control the memory 2040 and/or the transceiver 2060 and may be configured to implement descriptions, functions, procedures, proposals, methods, and/or operation flows described in the present disclosure. For example, the processor 2020 may process information in the memory 2040 and generate third information/signal and then transmit a radio signal including the third information/signal through the transceiver 2060. Further, the processor 2020 may receive a radio signal including fourth information/signal through the transceiver 2060 and then store in the memory 2040 information obtained from signal processing of the fourth information/signal. The memory 2040 may be connected to the processor 2020 and store various information related to an operation of the processor 2020. For example, the memory 2040 may store a software code including instructions for performing some or all of processes controlled by the processor 2020 or performing the descriptions, functions, procedures, proposals, methods, and/or operation flowcharts described in the present disclosure. The processor 2020 and the memory 2040 may be a part of a communication modem/circuit/chip designated to implement the wireless communication technology (e.g., LTE and NR). The transceiver 2060 may be connected to the processor 2020 and may transmit and/or receive the radio signals through one or more antennas 2080. The transceiver 2060 may include a transmitter and/or a receiver, and the transceiver 2060 may be mixed with the RF unit. In the present disclosure, the wireless device may mean the communication modem/circuit/chip.

Hereinafter, hardware elements of the wireless devices 1000 and 2000 will be described in more detail. Although not limited thereto, one or more protocol layers may be implemented by one or more processors 1020 and 2020. For example, one or more processors 1020 and 2020 may implement one or more layers (e.g., functional layers such as PHY, MAC, RLC, PDCP, RRC, and SDAP). One or more processors 1020 and 2020 may generate one or more protocol data units (PDUs) and/or one or more service data units (SDUs) according to the descriptions, functions, procedures, proposals, methods, and/or operation flowcharts described in the present disclosure. One or more processors 1020 and 2020 may generate a message, control information, data, or information according to the descriptions, functions, procedures, proposals, methods, and/or operation flowcharts described in the present disclosure. One or more processors 1020 and 2020 may generate a signal (e.g., a baseband signal) including the PDU, the SDU, the message, the control information, the data, or the information according to the function, the procedure, the proposal, and/or the method described in the present disclosure and provide the generated signal to one or more transceivers 1060 and 2060. One or more processors 1020 and 2020 may receive the signal (e.g. baseband signal) from one or more transceivers 1060 and 2060 and acquire the PDU, the SDU, the message, the control information, the data, or the information according to the descriptions, functions, procedures, proposals, methods, and/or operation flowcharts described in the present disclosure.

One or more processors 1020 and 2020 may be referred to as a controller, a microcontroller, a microprocessor, or a microcomputer. One or more processors 1020 and 2020 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 1020 and 2020. The descriptions, functions, procedures, proposals, and/or operation flowcharts described in the present disclosure may be implemented by using firmware or software and the firmware or software may be implemented to include modules, procedures, functions, and the like. Firmware or software configured to perform the descriptions, functions, procedures, proposals, and/or operation flowcharts described in the present disclosure may be included in one or more processors 1020 and 2020 or stored in one or more memories 1040 and 2040 and driven by one or more processors 1020 and 2020. The descriptions, functions, procedures, proposals, and/or operation flowcharts described in the present disclosure may be implemented by using firmware or software in the form of a code, the instruction and/or a set form of the instruction.

One or more memories 1040 and 2040 may be connected to one or more processors 1020 and 2020 and may store various types of data, signals, messages, information, programs, codes, indications and/or instructions. One or more memories 1040 and 2040 may be comprised of a ROM, a RAM, an EPROM, a flash memory, a hard drive, a register, a cache memory, a computer reading storage medium and/or a combination thereof. One or more memories 1040 and 2040 may be positioned inside and/or outside one or more processors 1020 and 2020. Further, one or more memories 1040 and 2040 may be connected to one or more processors 1020 and 2020 through various technologies such as wired or wireless connection.

One or more transceivers 1060 and 2060 may transmit to one or more other devices user data, control information, a wireless signal/channel, etc., mentioned in the methods and/or operation flowcharts of the present disclosure. One or more transceivers 1060 and 2060 may receive from one or more other devices user data, control information, a wireless signal/channel, etc., mentioned in the descriptions, functions, procedures, proposals, methods, and/or operation flowcharts described in the present disclosure. For example, one or more transceivers 1060 and 2060 may be connected to one or more processors 1020 and 2020 and transmit and receive the radio signals. For example, one or more processors 1020 and 2020 may control one or more transceivers 1060 and 2060 to transmit the user data, the control information, or the radio signal to one or more other devices. Further, one or more processors 1020 and 2020 may control one or more transceivers 1060 and 2060 to receive the user data, the control information, or the radio signal from one or more other devices. Further, one or more transceivers 1060 and 2060 may be connected to one or more antennas 1080 and 2080, and one or more transceivers 1060 and 2060 may be configured to transmit and receive the user data, control information, wireless signal/channel, etc., mentioned in the descriptions, functions, procedures, proposals, methods, and/or operation flowcharts described in the present disclosure through one or more antennas 1080 and 2080. In the present disclosure, one or more antennas may be a plurality of physical antennas or a plurality of logical antennas (e.g., antenna ports). One or more transceivers 1060 and 2060 may convert the received radio signal/channel from an RF band signal into a baseband signal, in order to process the received user data, control information, radio signal/channel, etc., using one or more processors 1020 and 2020. One or more transceivers 1060 and 2060 may convert the user data, control information, radio signal/channel, etc., processed using one or more processors 1020 and 2020, from the baseband signal into the RF band signal. To this end, one or more transceivers 1060 and 2060 may include an (analog) oscillator and/or filter.

Example of Signal Processing Circuit to which the Present Disclosure is Applied

FIG. 23 illustrates a signal processing circuit for a Tx signal.

Referring to FIG. 23, a signal processing circuit 10000 may include a scrambler 10100, a modulator 10200, a layer mapper 10300, a precoder 10400, a resource mapper 10500, and a signal generator 10600. Although not limited thereto, an operation/function of FIG. 23 may be performed by the processors 1020 and 2020 and/or the transceivers 1060 and 2060 of FIG. 22. Hardware elements of FIG. 23 may be implemented in the processors 1020 and 2020 and/or the transceivers 1060 and 2060 of FIG. 22. For example, blocks 10100 to 10600 may be implemented in the processors 1020 and 2020 of FIG. 22. Further, blocks 10100 to 10500 may be implemented in the processors 1020 and 2020 of FIG. 22, and the block 10600 may be implemented in the transceivers 1060 and 2060 of FIG. 22.

A codeword may be transformed into a radio signal via the signal processing circuit 10000 of FIG. 23. The codeword is an encoded bit sequence of an information block. The information block may include transport blocks (e.g., a UL-SCH transport block, a DL-SCH transport block, etc.). The radio signal may be transmitted on various physical channels (e.g., PUSCH, PDSCH, etc).

Specifically, the codeword may be transformed into a bit sequence scrambled by the scrambler 10100. A scramble sequence used for scrambling may be generated based on an initialization value, and the initialization value may include ID information, etc. of a wireless device. The scrambled bit sequence may be modulated into a modulated symbol sequence by the modulator 10200. A modulation scheme may include pi/2-binary phase shift keying (BPSK), m-phase shift keying (PSK), m-quadrature amplitude modulation (QAM), etc. A complex modulated symbol sequence may be mapped to one or more transport layers by the layer mapper 10300. Modulated symbols of each transport layer may be mapped to a corresponding antenna port(s) by the precoder 10400 (precoding). An output z of the precoder 10400 may be obtained by multiplying an output y of the layer mapper 10300 by a precoding matrix W of N*M, where N is the number of antenna ports, and M is the number of transport layers. The precoder 10400 may perform precoding after performing transform precoding (e.g., DFT transform) on complex modulated symbols. Further, the precoder 10400 may perform the precoding without performing the transform precoding.

The resource mapper 10500 may map the modulated symbols of each antenna port to time-frequency resources. The time-frequency resources may include a plurality of symbols (e.g., CP-OFDMA symbol and DFT-s-OFDMA symbol) in a time domain and include a plurality of subcarriers in a frequency domain. The signal generator 10600 may generate the radio signal from the mapped modulated symbols, and the generated radio signal may be transmitted to another device over each antenna. To this end, the signal generator 10600 may include an inverse fast Fourier transform (IFFT) module, a cyclic prefix (CP) insertor, a digital-to-analog converter (DAC), a frequency uplink converter, and the like.

A signal processing process for a received signal in the wireless device may be configured in the reverse of the signal processing processes 10100 to 10600 of FIG. 23. For example, the wireless device (e.g., 1000 and 2000 of FIG. 22) may receive the radio signal from the outside through the antenna port/transceiver. The received radio signal may be converted into a baseband signal through a signal reconstructor. To this end, the signal reconstructor may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which the Present Disclosure is Applied FIG. 24 illustrates another example of a wireless device applied to the present disclosure.

The wireless device may be implemented in various types of devices according to usage examples/services (see FIG. 21). Referring to FIG. 24, wireless devices 1000 and 2000 may correspond to the wireless devices 1000 and 2000 of FIG. 22 and may be comprised of various elements, components, units, and/or modules. For example, the wireless devices 1000 and 2000 may include a communication unit 1100, a control unit 1200, and a memory unit 1300, and an additional element 1400. The communication unit 1100 may include a communication circuit 1120 and a transceiver(s) 1140. For example, the communication circuit 1120 may include one or more processors 1020 and 2020 and/or one or more memories 1040 and 2040 of FIG. 22. For example, the transceiver(s) 1140 may include one or more transceivers 1060 and 2060 and/or one or more antennas 1080 and 2080 of FIG. 22. The control unit 1200 is electrically connected to the communication unit 1100, the memory unit 1300, and the additional element 1400 and controls an overall operation of the wireless device. For example, the control unit 1200 may an electrical/mechanical operation of the wireless device based on a program/code/instruction/information stored in the memory unit 1300. Further, the control unit 1200 may transmit the information stored in the memory unit 1300 to the outside (e.g., other communication devices) through the communication unit 1100 via a wireless/wired interface, or store information received from the outside (e.g., other communication devices) via the wireless/wired interface through the communication unit 1100.

The additional element 1400 may be variously configured according to the type of wireless device. For example, the additional element 1400 may include at least one of a power unit/battery, an input/output (I/O) unit, a driving unit, and a computing unit. Although not limited thereto, the wireless device may be implemented as a form such as the robot 1000a of FIG. 21, the vehicles 1000b-1 and 1000b-2 of FIG. 21, the XR device 1000c of FIG. 21, the portable device 1000d of FIG. 21, the home appliance 1000e of FIG. 21, the IoT device 1000f of FIG. 21, a digital broadcasting terminal, a hologram device, a public safety device, an MTC device, a medical device, a FinTech device (or financial device), a security device, a climate/environment device, an AI server/device 4000 of FIG. 21, the base station 2000 of FIG. 21, a network node, etc. The wireless device may be movable or may be used at a fixed place according to use examples/services.

In FIG. 24, all of various elements, components, units, and/or modules in the wireless devices 1000 and 2000 may be interconnected via the wired interface or at least may be wirelessly connected through the communication unit 1100. For example, the control unit 1200 and the communication 1100 in the wireless devices 1000 and 2000 may be wiredly connected and the control unit 1200 and the first unit (e.g., 1300 or 1400) may be wirelessly connected through the communication unit 1100. Further, each element, component, unit, and/or module in the wireless devices 1000 and 2000 may further include one or more elements. For example, the control unit 1200 may be constituted by one or more processor sets. For example, the control unit 1200 may be configured a set of a communication control processor, an application processor, an electronic control unit (ECU), a graphic processing processor, a memory control processor, etc. As another example, the memory unit 1300 may be configured as a random access memory (RAM), a dynamic RAM (DRAM), a read only memory (ROM), a flash memory, a volatile memory, a non-volatile memory, and/or combinations thereof.

FIG. 25 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a mobile station (MS), a user terminal (UT), a mobile subscriber station (MSS), a subscriber station (SS), an advanced mobile station (AMS), or a wireless terminal (WT).

Referring to FIG. 25, a portable device 1000 may include an antenna unit 1080, a communication unit 1100, a control unit 1200, a memory unit 1300, a power supply unit 1400a, an interface unit 1400b, and an input/output unit 1400c. The antenna unit 1080 may be configured as a part of the communication unit 1100. The blocks 1100 to 1300/1400a to 1400c correspond to the blocks 1100 to 1300/1400 of FIG. 24, respectively.

The communication unit 1100 may transmit/receive a signal (e.g., data, a control signal, etc.) to/from other wireless devices and base stations. The control unit 1200 may perform various operations by controlling components of the portable device 1000. The control unit 1200 may include an application processor (AP). The memory unit 1300 may store data/parameters/programs/codes/instructions required for driving the portable device 1000. Further, the memory unit 1300 may store input/output data/information, etc. The power supply unit 1400a may supply power to the portable device 1000 and include a wired/wireless charging circuit, a battery, and the like. The interface unit 1400b may support a connection between the portable device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display 1400d, a speaker, and/or a haptic module.

For example, in the case of data communication, the input/output unit 1400c may acquire information/signal (e.g., touch, text, voice, image, video, etc.) input from the user, and the acquired information/signal may be stored in the memory unit 1300. The communication unit 1100 may transform the information/signal stored in the memory into the radio signal and directly transmit the radio signal to another wireless device or transmit the radio signal to the base station. Further, the communication unit 1100 may receive the radio signal from another wireless device or base station and then reconstruct the received radio signal into original information/signal. The reconstructed information/signal may be stored in the memory unit 1300 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has described a method of transmitting and receiving a PDCCH in a wireless communication system, focusing on examples applying to the 3GPP LTE/LTE-A system, and the 5G system (new RAT system), the present disclosure can be applied to various wireless communication systems other than these systems.

The invention claimed is:

1. A method of transmitting, by a base station, a plurality of physical downlink control channels (PDCCHs) in a wireless communication system, the method comprising:
receiving, from a user equipment (UE), UE capability information representing a number of simultaneously supportable beams;
transmitting, to the UE, independent layer joint transmission (ILJT)-related configuration information; and
transmitting, to the UE, the plurality of PDCCHs based on the ILJT-related configuration information,
wherein the ILJT-related configuration information includes information for the plurality of PDCCHs scheduling a plurality of physical downlink shared channels (PDSCHs) that are overlapped, a scheduling offset threshold value separately configured for the plurality of PDCCHs scheduling the plurality of overlapping PDSCHs, and information for a control resource set (CORESET) which is configured based on at least one index representing a group of CORESETs, and
wherein a number of the at least one index is determined based on the UE capability information.

2. The method of claim 1, wherein, based on the UE not simultaneously supporting a plurality of beams, a control resource set is configured based on one index.

3. The method of claim 1,
wherein, based on the UE simultaneously supporting two beams, the control resource set is configured based on two indexes,
wherein a first PDCCH of a control resource set with a first index is transmitted from a different transmission and reception point, panel, or beam from a second PDCCH of a control resource set with a second index.

4. The method of claim 3, wherein the first PDCCH is received based on different QCL information for spatial parameter from the second PDCCH.

5. A base station transmitting a plurality of physical downlink control channels (PDCCHs) in a wireless communication system, the base station comprising:
one or more transceivers:
one or more processors; and
one or more memories functionally connected to the one or more processors and storing instructions performing operations,
wherein the operations include:
receiving, from a user equipment (UE), UE capability information representing a number of simultaneously supportable beams;
transmitting, to the UE, independent layer joint transmission (ILJT)-related configuration information; and
transmitting, to the UE, the plurality of PDCCHs based on the ILJT-related configuration information,
wherein the ILJT-related configuration information includes information for the plurality of PDCCHs scheduling a plurality of physical downlink shared channels (PDSCHs) that are overlapped, a scheduling offset threshold value separately configured for the plurality of PDCCHs scheduling the plurality of overlapping PDSCHs, and information for a control resource set (CORESET) which is configured based on at least one index representing a group of CORESETs, and
wherein a number of the at least one index is determined based on the UE capability information.

6. The base station of claim 5, wherein, based on the UE not simultaneously supporting a plurality of beams, a control resource set is configured based on one index.

7. The base station of claim 5,
wherein, based on the UE simultaneously supporting two beams, the control resource set is configured based on two indexes,
wherein a first PDCCH of a control resource set with a first index is transmitted from a different transmission and reception point, panel, or beam from a second PDCCH of a control resource set with a second index.

8. The base station of claim 7, wherein the first PDCCH is received based on different QCL information for spatial parameter from the second PDCCH.

9. A device comprising:
one or more memories; and
one or more processors functionally connected to the one or more memories,
wherein the one or more processors are configured to allow the device to:
receive, from a user equipment (UE), UE capability information representing a number of simultaneously supportable beams;
transmit, to the UE, independent layer joint transmission (ILJT)-related configuration information; and
transmit, to the UE, the plurality of PDCCHs based on the ILJT-related configuration information,
wherein the ILJT-related configuration information includes information for the plurality of PDCCHs scheduling a plurality of physical downlink shared channels (PDSCHs) that are overlapped, a scheduling offset threshold value separately configured for the plurality of PDCCHs scheduling the plurality of overlapping PDSCHs, and information for a control resource set (CORESET) which is configured based on at least one index representing a group of CORESETs, and
wherein a number of the at least one index is determined based on the UE capability information.

10. A non-transitory computer readable medium (CRM) storing one or more commands,
wherein the one or more commands, that are executable by one or more processors, cause a base station to:
receive, from a user equipment (UE), UE capability information representing a number of simultaneously supportable beams;
transmit, to the UE, independent layer joint transmission (ILJT)-related configuration information; and
transmit, to the UE, the plurality of PDCCHs based on the ILJT-related configuration information,
wherein the ILJT-related configuration information includes information for the plurality of PDCCHs scheduling a plurality of physical downlink shared channels (PDSCHs) that are overlapped, a scheduling offset threshold value separately configured for the plurality of PDCCHs scheduling the plurality of overlapping PDSCHs, and information for a control resource set (CORESET) which is configured based on at least one index representing a group of CORESETs, and
wherein a number of the at least one index is determined based on the UE capability information.

* * * * *